US010515359B2

(12) United States Patent
Collinge et al.

(10) Patent No.: US 10,515,359 B2
(45) Date of Patent: Dec. 24, 2019

(54) SYSTEMS AND METHODS FOR PROCESSING MOBILE PAYMENTS BY PROVISIONING CREDENTIALS TO MOBILE DEVICES WITHOUT SECURE ELEMENTS

(71) Applicant: MasterCard International Incorporated, Purchase, NY (US)

(72) Inventors: Mehdi Collinge, Braine-l'Alleud (BE); Susan Thompson, Burland (GB); Patrik Smets, Nijlen (BE); David Anthony Roberts, Appleton (GB); Michael Christopher Ward, Bridgwater (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1003 days.

(21) Appl. No.: 13/827,042

(22) Filed: Mar. 14, 2013

(65) Prior Publication Data
US 2013/0262317 A1 Oct. 3, 2013

Related U.S. Application Data

(60) Provisional application No. 61/619,095, filed on Apr. 2, 2012, provisional application No. 61/635,248, filed on (Continued)

(51) Int. Cl.
*G06Q 20/38* (2012.01)
*G06Q 20/40* (2012.01)
*G06Q 20/32* (2012.01)

(52) U.S. Cl.
CPC ....... *G06Q 20/3823* (2013.01); *G06Q 20/322* (2013.01); *G06Q 20/385* (2013.01); *G06Q 20/405* (2013.01); *G06Q 20/4012* (2013.01)

(58) Field of Classification Search
CPC .................................................. G06Q 20/385
See application file for complete search history.

(56) References Cited

U.S. PATENT DOCUMENTS 7,059,517 B2 * 6/2006 Hopkins .............. G06Q 20/347
235/382
2002/0152180 A1 * 10/2002 Turgeon ................ G06Q 20/04
705/72

(Continued)

FOREIGN PATENT DOCUMENTS

| GB | 2506591 A | 4/2014 |
|---|---|---|
| WO | 2014048990 A1 | 4/2014 |
| WO | 2014049136 A1 | 4/2014 |

OTHER PUBLICATIONS

European Search Report issued by the European Patent Office dated Oct. 29, 2015 in corresponding European Patent Application No, 13772978.6 filed on Mar. 21, 2013 (9 pages).

(Continued)

*Primary Examiner* — Lena Najarian
(74) *Attorney, Agent, or Firm* — Buchanan Ingersoll & Rooney PC

(57) ABSTRACT

A method for generating and provisioning payment credentials to a mobile device lacking a secure element includes: generating a card profile associated with a payment account, wherein the card profile includes at least payment credentials corresponding to the associated payment account and a profile identifier; provisioning, to a mobile device lacking a secure element, the generated card profile; receiving, from the mobile device, a key request, wherein the key request includes at least a mobile identification number (PIN) and the profile identifier; using the mobile PIN; generating a single use key, wherein the single use key includes at least the profile identifier, an application transaction counter, and a generating key for use in generating a payment cryptogram (Continued)

valid for a single financial transaction; and transmitting the generated single use key to the mobile device.

18 Claims, 19 Drawing Sheets

Related U.S. Application Data on Apr. 18, 2012, provisional application No. 61/735,383, filed on Dec. 10, 2012, provisional application No. 61/762,098, filed on Feb. 7, 2013.

(56) References Cited

U.S. PATENT DOCUMENTS

| | | |
|---|---|---|
| 2008/0040285 A1 | 2/2008 | Wankmueller |
| 2008/0051122 A1 | 2/2008 | Fisher |
| 2010/0333239 A1 | 12/2010 | Khan |
| 2012/0074219 A1* | 3/2012 | Burdett ............... G06Q 20/322 235/380 |
| 2012/0144203 A1* | 6/2012 | Albisu ................. G06F 21/35 713/184 |
| 2012/0240195 A1* | 9/2012 | Weiss ................. H04L 63/0846 726/4 |

OTHER PUBLICATIONS

Notification of Transmittal of the International Search Report (Forms PCT/ISA/220 and PCT/ISA/210 and the Written Opinion of the International Searching Authority (Form PCT/ISA/237) dated May 16, 2013, issued in corresponding International Application No. PCT/US2013/033322. (11 pages).

Stig Frode Mjølsnes et al., "Localized Credentials for Server Assisted Mobile Wallet", Proceedings 2001 International Conference on Computer Networks and Mobile Computing, IEEE, 2001, 9 pages.

First Examination Report issued by the Australian Patent Office dated Apr. 29, 2016 in corresponding Australian Patent Application No. 2013243895 filed on Mar. 21, 2013 (4 pages).

Examination Report No. 1 for standard patent application dated Oct. 16, 2018, by the Australian Patent Office in corresponding Australian Patent Application No. 2017216488. (5 pages).

\* cited by examiner

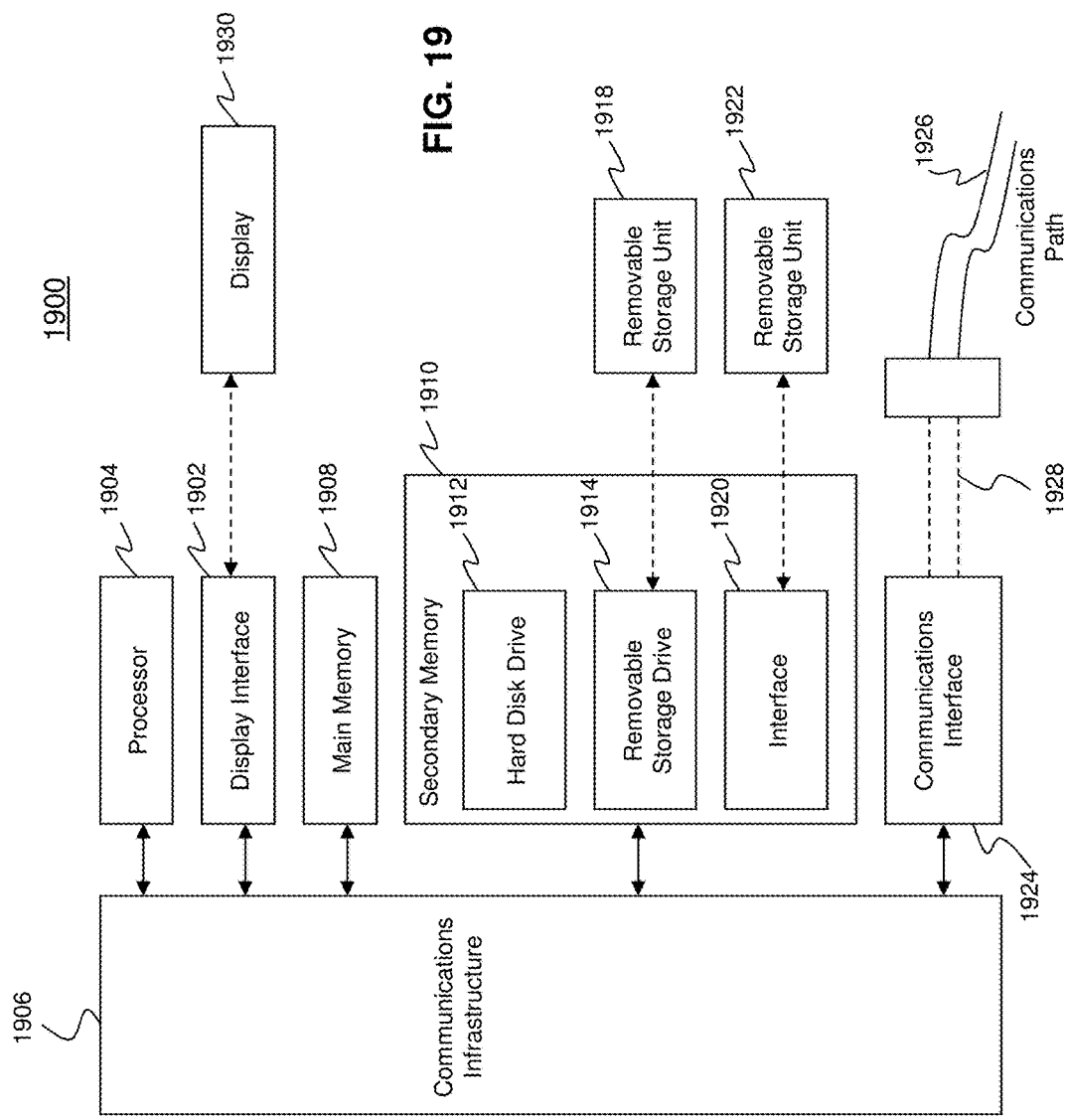

SYSTEMS AND METHODS FOR PROCESSING MOBILE PAYMENTS BY PROVISIONING CREDENTIALS TO MOBILE DEVICES WITHOUT SECURE ELEMENTS

RELATED APPLICATIONS

This application claims the priority benefit of commonly assigned U.S. Provisional Application No. 61/619,095, filed Apr. 2, 2012, entitled "Method and System for Processing mobile Payments for Devices Without Secure Elements"; U.S. Provisional Application No. 61/639,248, filed Apr. 18, 2012, entitled "Method and System for Processing mobile Payments by Provisioning Credentials to Mobile Devices Without Secure Elements"; U.S. Provisional Application No. 61/735,383, filed Dec. 10, 2012, entitled "Systems and Methods for Processing Mobile Payments by Provisioning Credentials to Mobile Devices Without Secure Elements," by Mehdi Collinge et al.; and U.S. Provisional Application No. 61/762,098, filed Feb. 7, 2013, entitled "Systems and Methods for Processing Mobile Payments by Provisioning Credentials to Mobile Devices Without Secure Elements," by Mehdi Collinge et al., which are each herein incorporated by reference in their entirety.

FIELD

The present disclosure relates to provisioning of payment credentials to a mobile device lacking a secure element, specifically the provisioning and storage of payment credentials for use in conducting a near field financial transaction using a mobile device lacking a secure element.

BACKGROUND

Advances in both mobile and communication technologies have created tremendous opportunities, one of which is providing user of mobile computing devices the ability to initiate payment transactions using their mobile device. One such approach to enable mobile devices to conduct payment transactions has been the use of near field communication (NFC) technology to securely transmit payment information to a nearby contactless point-of-sale terminal. In order to achieve this, mobile phones with secure element hardware (e.g., a Secure Element chip) are used to securely store payment account credentials, such as credit card credentials.

However, not all mobile devices have secure elements. Furthermore, some issuers may not have access to a secure element on a mobile device, even if the mobile device has one available. As a result, a consumer who has a NFC-capable mobile device may not be able to use their device to conduct payment transactions if their mobile device lacks a secure element, and even in some cases where their mobile device has a secure element.

Thus, there is a need for a technical solution to enable a mobile device lacking a secure element to conduct contactless payment transactions.

SUMMARY

The present disclosure provides a description of a systems and methods for the provisioning of payment credentials to mobile devices lacking secure elements for use in mobile payment transactions.

A method for generating and provisioning payment credentials to a mobile device lacking a secure element includes: generating, by a processing device, a card profile associated with a payment account, wherein the card profile includes at least payment credentials corresponding to the associated payment account and a profile identifier; provisioning, to a mobile device, the generated card profile; receiving, from the mobile device, a key request, wherein the key request includes at least a mobile identification number (PIN) and the profile identifier; using, by an authentication device, the mobile PIN; generating, by the processing device, a single use key, wherein the single use key includes at least the profile identifier, an application transaction counter, and a generating key for use in generating a payment cryptogram valid for a single financial transaction; and transmitting, by a transmitting device, the generated single use key to the mobile device, wherein the mobile device is not required to have a secure element.

A method for generating a payment cryptogram in a mobile device lacking a secure element includes: receiving, by a receiving device, a card profile, wherein the card profile includes at least payment credentials corresponding to a payment account and a profile identifier; receiving, by an input device, a mobile personal identification number (PIN) input by a user of the mobile device; transmitting, by a transmitting device, a key request, wherein the key request includes at least the profile identifier; receiving, by the receiving device, a single use key, wherein the single use key includes at least an application transaction counter and a generating key; generating, by a processing device, a payment cryptogram valid for a single financial transaction based on at least the received single use key and the mobile PIN; and transmitting, via near field communication, at least the payment credentials and the generated payment cryptogram to a point-of-sale terminal for use in a financial transaction.

Another method for generating and provisioning payment credentials to a mobile device lacking a secure element includes: storing, in a database, at least a storage key, a plurality of dynamic card validation code keys, and an application transaction counter associated with a mobile application program; provisioning, to the mobile device, at least the storage key, an authentication component, and static payment credentials, wherein the static payment credentials are associated with a payment account; receiving, from a mobile device, a chip authentication program (CAP) token; validating, by a validation device, the authenticity of the received CAP token; generating, by a processing device, a session key unpredictable number ($KS_{UN}$); generating, by the processing device, a cloud unpredictable number ($UN_{CLOUD}$); identifying, by the processing device, an encrypted payload based on a derived dynamic card validation code key ($KD_{CVC3}$), wherein the encrypted payload includes at least a dynamic card validation code key of the plurality of dynamic card validation code keys, the $KS_{UN}$, and the application transaction counter; transmitting, by a transmitting device, the encrypted payload to the mobile device for use in generating a dynamic card validation code for use in a financial transaction; and transmitting, by the transmitting device, at least the $KS_{UN}$, $UN_{CLOUD}$, and application transaction counter to an issuer associated with the payment account for use in validating the generated dynamic card validation code used in the financial transaction.

A method for generating a dynamic card validation code in a mobile device lacking a secure element includes: receiving, by a receiving device, at least a storage key, an authentication component, and static payment credentials; receiving, by an input device, at least one additional credential; generating, by a processing device, a chip authentication program (CAP) token, wherein the CAP token is based on at least the authentication component and the at least one additional credential; transmitting, by a transmitting device, the generated CAP token; receiving, by the receiving device, an encrypted payload, wherein the encrypted payload includes at least a supplied dynamic card validation code, session key unpredictable number, and application transaction counter; decrypting, by the processing device, the encrypted payload using at least the received storage key; receiving, via near field communication, a reader unpredictable number from a point-of-sale terminal; generating, by the processing device, a payment dynamic card validation code based on at least the supplied dynamic card validation code, the session key unpredictable number, the application transaction counter, and the reader unpredictable number; and transmitting, via near field communication, the generated payment dynamic card validation code and the application transaction counter to the point-of-sale terminal for including in an authorization request for a financial transaction.

A system for generating and provisioning payment credentials to a mobile device lacking a secure element includes a transmitting device, a processing device, a provisioning device, a receiving device, and an authentication device. The processing device is configured to generate a card profile associated with a payment account, wherein the card profile includes at least payment credentials corresponding to the associated payment account and a profile identifier. The provisioning device is configured to provision, to a mobile device lacking a secure element, the generated card profile. The receiving device is configured to receive, from the mobile device, a key request, wherein the key request includes at least a mobile identification number (PIN) and the profile identifier. The authentication device is configured to use the mobile PIN. The processing device is further configured to generate a single use key, wherein the single use key includes at least the profile identifier, an application transaction counter, and a generating key for use in generating a payment cryptogram valid for a single financial transaction. The transmitting device is configured to transmit the generated single use key to the mobile device.

A system for generating a payment cryptogram in a mobile device lacking a secure element includes a processing device, a receiving device, an input device, and a transmitting device. The receiving device is configured to receive a card profile, wherein the card profile includes at least payment credentials corresponding to a payment account and a profile identifier. The input device is configured to receive a mobile personal identification number (PIN) input by a user of the mobile device. The transmitting device is configured to transmit a key request, wherein the key request includes at least the profile identifier. The receiving device is further configured to receive a single use key, wherein the single use key includes at least an application transaction counter and a generating key. The processing device is configured to generate a payment cryptogram valid for a single financial transaction based on at least the received single use key and the mobile PIN. The transmitting device is further configured to transmit, via near field communication, at least the payment credentials and the generated payment cryptogram to a point-of-sale terminal for use in a financial transaction.

Another system for generating and provisioning payment credentials to a mobile device lacking a secure element includes a database, a provisioning device, a receiving device, a processing device, and a transmitting device. The database is configured to store at least a storage key, a plurality of dynamic card validation code keys, and an application transaction counter associated with a mobile application program. The provisioning device is configured to provision, to the mobile device, at least the storage key, an authentication component, and static payment credentials, wherein the static payment credentials are associated with a payment account. The receiving device is configured to receive, from a mobile device, a chip authentication program (CAP) token. The processing device is configured to: validate the authenticity of the received CAP token; generate a session key unpredictable number ($KS_{UN}$); generate a cloud unpredictable number ($UN_{CLOUD}$); and identify an encrypted payload based on a derived dynamic card validation code key ($KD_{CVC3}$), wherein the encrypted payload includes at least a dynamic card validation code key of the plurality of dynamic card validation code keys, the $KS_{UN}$, and the application transaction counter. The transmitting device is configured to: transmit the encrypted payload to the mobile device for use in generating a dynamic card validation code for use in a financial transaction; and transmit at least the $KS_{UN}$, $UN_{CLOUD}$, and application transaction counter to an issuer associated with the payment account for use in validating the generated dynamic card validation code used in the financial transaction.

A system for generating a dynamic card validation code in a mobile device lacking a secure element includes a receiving device, an input device, a processing device, and a transmitting device. The receiving device is configured to receive at least a storage key, an authentication component, and static payment credentials. The input device is configured to receive at least one additional credential. The processing device is configured to generate a chip authentication program (CAP) token, wherein the CAP token is based on at least the authentication component and the at least one additional credential. The transmitting device is configured to transmit the generated CAP token. The receiving device is further configured to receive an encrypted payload, wherein the encrypted payload includes at least a supplied dynamic card validation code, session key unpredictable number, and application transaction counter. The processing device is further configured to decrypt the encrypted payload using at least the received storage key. The receiving device is further configured to receive, via near field communication, a reader unpredictable number from a point-of-sale terminal. The processing device is further configured to generate a payment dynamic card validation code based on at least the supplied dynamic card validation code, the session key unpredictable number, the application transaction counter, and the reader unpredictable number. The transmitting device is further configured to transmit, via near field communication, the generated payment dynamic card validation code and the application transaction counter to the point-of-sale terminal for including in an authorization request for a financial transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 19 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

System for Generating and Provisioning Payment Credentials

Figure 1:
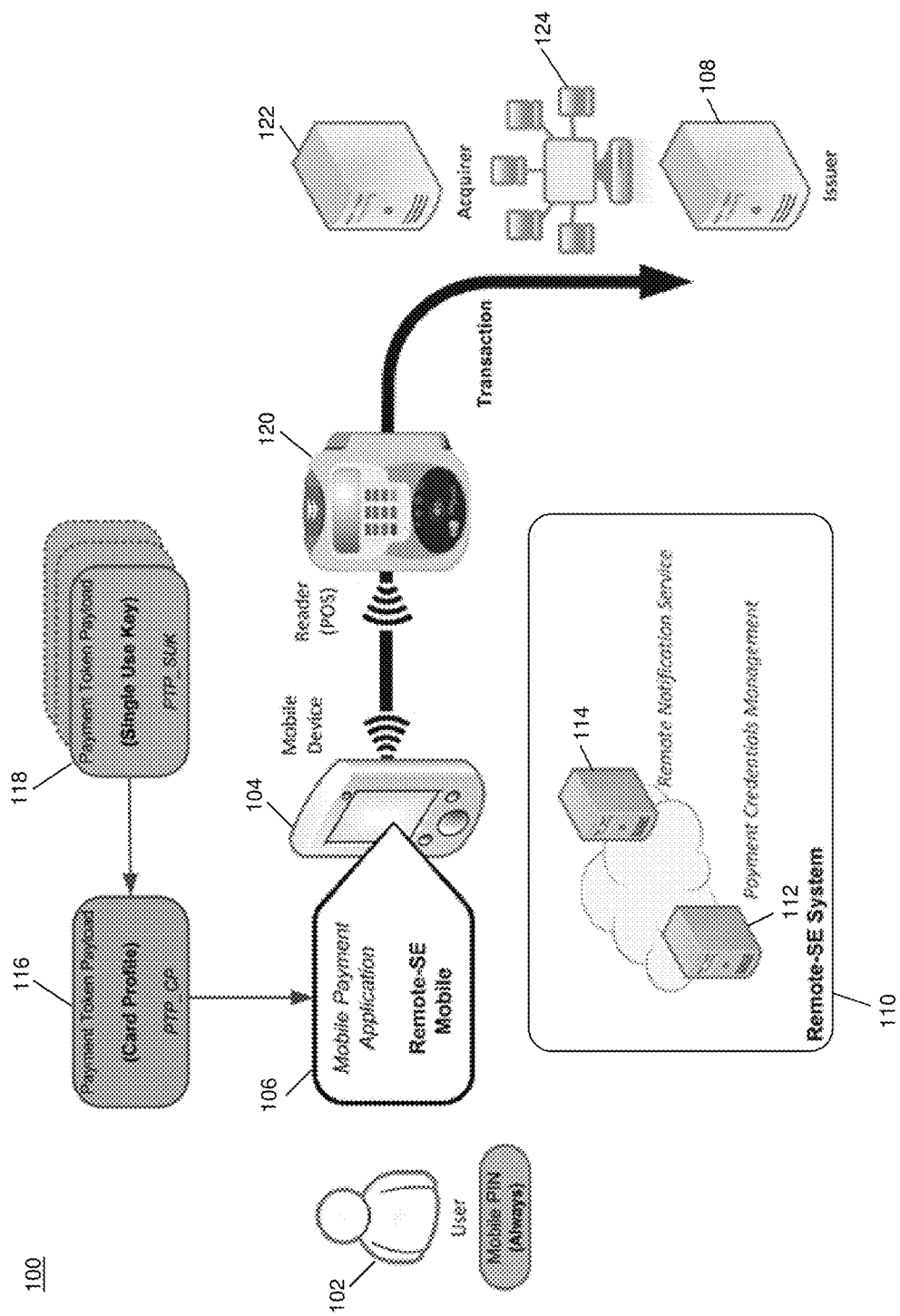
FIG. 1 is a high level diagram illustrating a system for generating and provisioning payment credentials to a mobile device in accordance with exemplary embodiments.

FIG. 1 is a diagram illustrating a system 100 for the generating and provisioning of payment credentials to a mobile device lacking a secure element.

The system 100 may include a user 102. The user 102 may possess a mobile device 104. The mobile device 104 may be any type of mobile computing device suitable for performing the functions as disclosed herein, such as a cellular phone, smart phone, tablet computer, personal digital assistant, etc. In an exemplary embodiment, the mobile device 104 may not include a secure element.

The mobile device 104 may include a mobile payment application 106, which may be an application program stored in data storage of the mobile device 104 and executed by a processor included in the mobile device 104. The mobile payment application 106 may be configured to receive and store payment credentials and conduct payment transactions via near field communication without the use of a secure element, as discussed in more detail herein.

The user 102 may have a payment account with an issuer 108, such as a credit card account. The user 102 may desire to use their mobile device 104 to conduct payment transactions using their payment account with the issuer 108 for funding of the transactions. Payment credentials corresponding to the payment account may be stored by a remote-SE (remote-secure element) system 110 for provisioning to the mobile device 104. The remote-SE system 110 may include at least a payment credentials management service 112 and a remote notification server 114, each of which are discussed in more detail below.

The remote-SE system 110 may build a payment token payload in order to provision the payment credentials to the mobile device 104 for use in a payment transaction. The payment token payload (PTP) may be a container used to carry payment credentials from the remote-SE system 100 to the mobile payment application 106 in the mobile device 104. The payment token payload may include a card profile 116 and a single use key 118, discussed in more detail below. The card profile 116 may include the payment credentials, and the single use key 118 may be a single use (e.g., one-time use) key used to generate a payment cryptogram valid for a single payment transaction. In some embodiments, the remote-SE system 110 and the mobile device 104 may communicate using dual channel communication, discussed in more detail below.

The mobile device 104 may be further configured to transmit a generated payment cryptogram and payment credentials to a point-of-sale terminal 120 at a merchant. The point-of-sale terminal 120 may be any type of point-of-sale terminal or device suitable for receiving payment credentials via near field communication (NFC). Suitable methods and protocols for the secure transmission of information via NFC will be apparent to persons having skill in the relevant art. The point-of-sale terminal 120 may transmit the received payment credentials and other transaction information (e.g., transaction amount, product details, etc.) to an acquirer 122, such as an acquiring bank.

The acquirer 122 may submit an authorization request for the payment transaction to a payment network 124. The payment network 124 may be configured to process the authorization request, such as by querying the issuer 108 for approval of the payment transaction (e.g., based on funds or credits in the payment account). The payment network 124 may then submit an authorization response to the acquirer 122 and/or the merchant, who may then finalize the payment transaction with the user 102. Methods and systems suitable for the processing of a financial transaction will be apparent to persons having skill in the relevant art.

The system 100 and the use of the payment token payload may enable the user 102 to use the mobile device 104 to conduct NFC payment transactions without the use of a secure element.

Payment Token Payload

Figure 2:
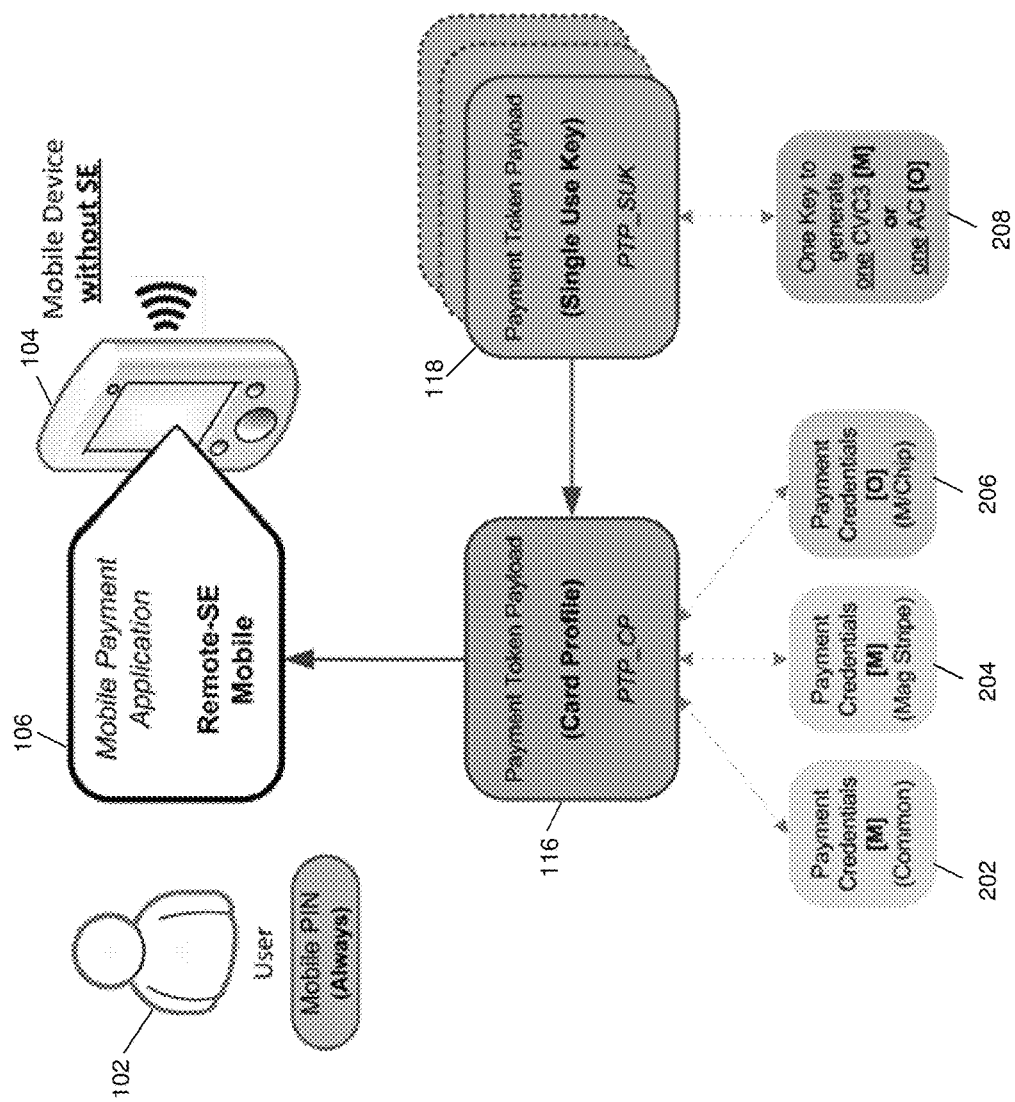
FIG. 2 is a block diagram illustrating the payment token payload of the system of FIG. 1 in accordance with exemplary embodiments.

FIG. 2 is a diagram illustrating the payment token payload provisioned to the mobile device 104 in additional detail.

As discussed above, the payment token payload may include the card profile 116 and the single use key 118. The card profile 116 may include payment credentials provisioned to the mobile payment application 106 by the remote-SE system for use in conducting payment transactions. The payment credentials included in the card profile 116 may include common payment credentials 202, magnetic stripe (mag stripe) payment credentials 204, and m/chip payment credentials 206.

The common payment credentials 202 may include all data elements common to any type of payment transactions, such as both mag stripe and m/chip payment transactions. Such data elements may include payment account number, tracking data, and card layout description data. The mag stripe payment credentials 204 may include data elements specific to mag stripe transactions, such as the number of digits in an application transaction counter and a bitmap for an unpredictable number and the application transaction counter. The m/chip payment credentials 206 may include data elements specific to m/chip payment transactions, such as issuer action codes, risk management data, and offline data authentication object lists. In some embodiments, the mag stripe payment credentials 204 may be mandatory in the card profile 116 and the m/chip payment credentials 206 may be optional.

The single use key 118 may be a payment token used one time to generate a payment cryptogram to be used in a payment transaction. The single use key may include an application transaction counter (ATC) and a generating key 208. The application transaction counter may be a count of transactions used for fraud management and authentication as will be apparent to persons having skill in the relevant art. The generating key 208 may be a key used to generate a payment cryptogram used in a financial transaction. In one embodiment, the generating key 208 may generate a dynamic card validation code (CVC3) or an application cryptogram (AC). In a further embodiment, the application cryptogram may be optional.

The single use key 118 may also include an identifier used to identify the card profile 116 to which it corresponds to. In some embodiments, the single use key 118 may be protected based on a mobile personal identification number (PIN) value. In such an embodiment, the user 102 may provide a mobile PIN for authentication. If the mobile PIN provided is incorrect, an incorrect value of the single use key may be used by the mobile payment application 106. In such an instance, the issuer 108 will not authorize the payment transaction. Such an embodiment may result in additional security for the user 102, the issuer 108, and the merchant involved in the payment transaction.

Alternative System for Generating and Provisioning Payment Credentials

Figure 3:
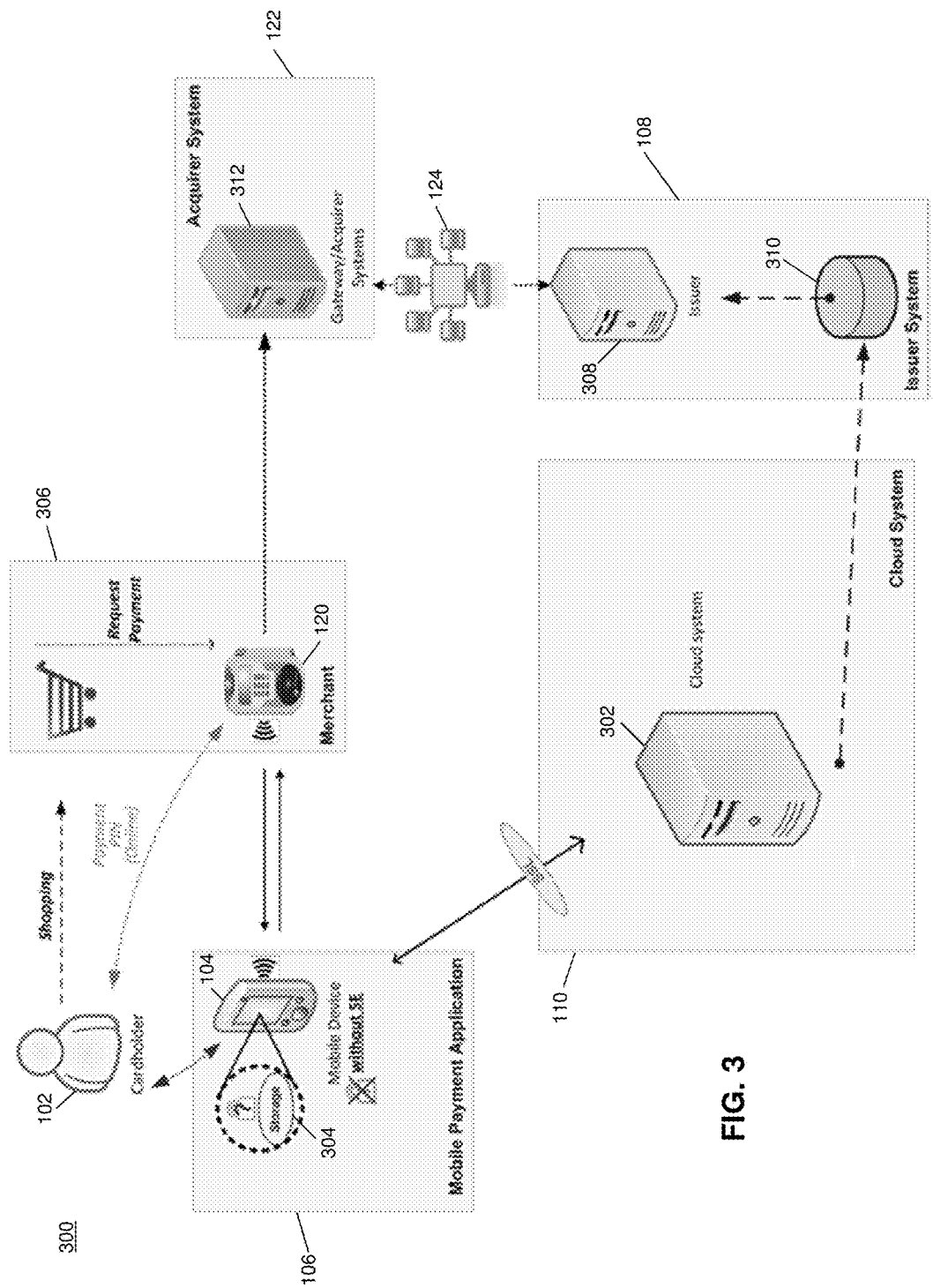
FIG. 3 is a high level diagram illustrating an alternative system for provisioning payment credentials to a mobile device in accordance with exemplary embodiments.

FIG. 3 illustrates an alternative system 300 for generating and provisioning payment credentials to the mobile device 104 lacking a secure element.

In the system 300, the mobile device 104 may include the mobile payment application 106. The mobile device 104 may also include storage 304, such as a database. The remote-SE system 110 may include a cloud system 302. The cloud system 302 may store keys, payment credentials, and an application transaction counter, which may be provisioned from the cloud system 302 to the mobile device 104 and stored in the storage 304.

The mobile device 104 may generate a chip authentication program (CAP) token. The generation and use of CAP tokens will be apparent to persons having skill in the relevant art. The mobile device 104 may transmit the generated CAP token to the cloud system 302. The cloud system 302 may then authenticate (e.g., validate) the CAP token, such as by using a CAP token validation system as will be apparent to persons having skill in the relevant art. The cloud system 302 may then generate unpredictable numbers, and may generate an encrypted payload including a derived dynamic card validation code key ($KD_{CVC3}$) and the generated unpredictable number. The cloud system 302 may also transmit at least some of the information to the issuer 108. The issuer 108 may store the received information in an issuer database 310.

The encrypted payload may be transmitted to the mobile device 104, which may decrypt the payload and then generate a dynamic card validation code based on the information included in the encrypted payload and stored payment credentials. The user 102 may shop at a merchant 306, and, when goods or services have been selected for purchase, may transmit the payment credentials and dynamic card validation code from the mobile device 104 to the point-of-sale terminal 120. The point-of-sale terminal 120 may transmit the information and relevant transaction information to the acquirer 122.

An acquirer processing server 312 may receive the information at the acquirer 122 and may generate and submit an authorization request for the financial transaction including the payment credentials and dynamic card validation code to the payment network 124. The payment network 124 may forward relevant information to the issuer 108 for authorization of the transaction for a specific transaction amount. The issuer 108 may include an issuer processing server 308. The issuer processing server 308 may authenticate the dynamic card validation code based on the information stored in the issuer database 310 and received from the cloud system 302. The issuer 108 may then, based on the authentication, approve or deny the payment transaction.

The issuer 108 may submit a response to the payment network 124, which may then submit an authorization response to the acquirer 122. The acquirer may inform the merchant 306 of the results of the authorization, who may then finalize the transaction with the cardholder 102. Methods for provisioning payment credentials to the mobile device 104 and for processing a payment transaction via the mobile device 104 are discussed in more detail below.

Dual Channel Communication

Figure 4:
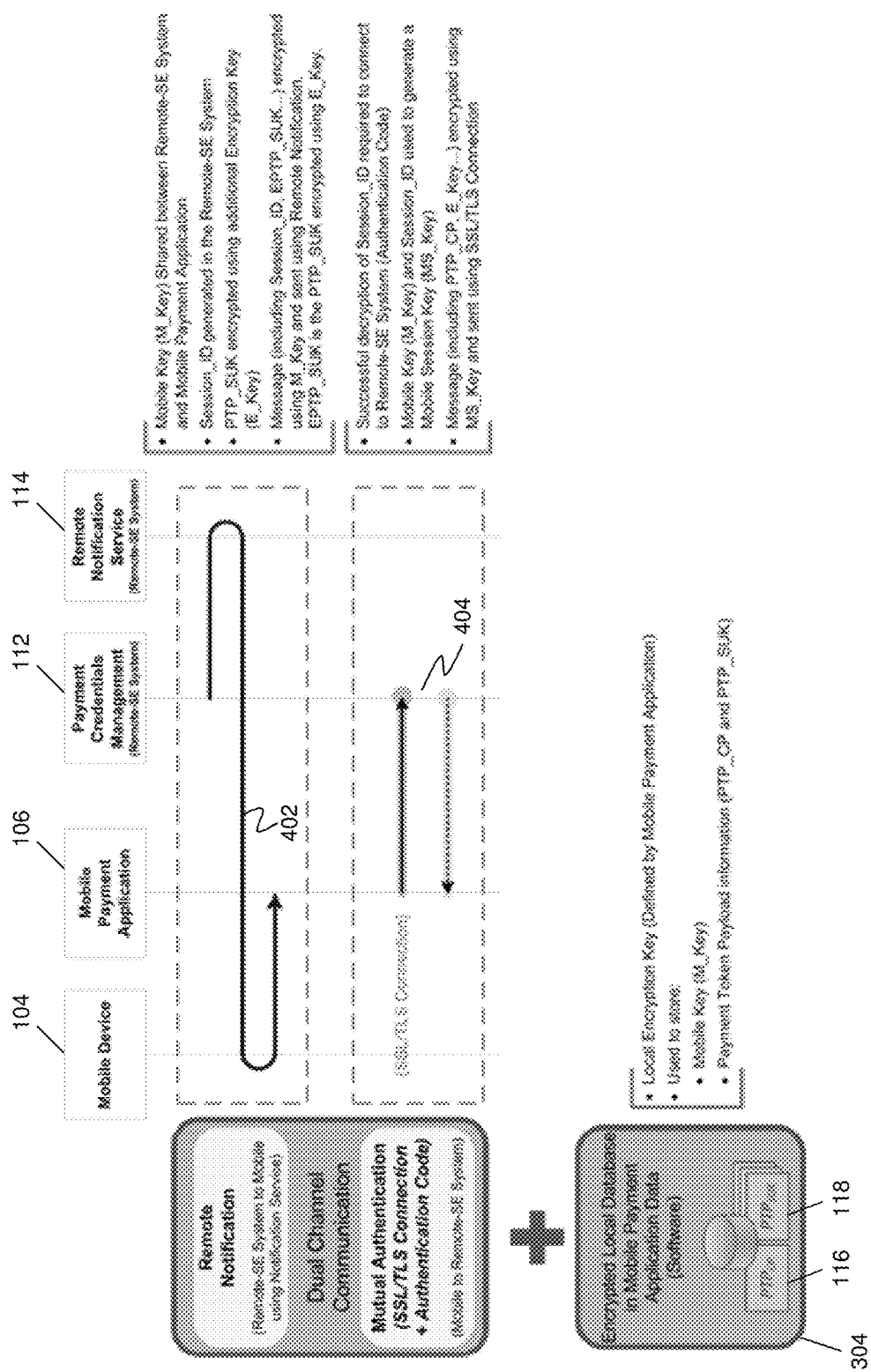
FIG. 4 is a diagram illustrating a method for dual channel communication for use in the system of FIG. 1 in accordance with exemplary embodiments.

FIG. 4 illustrates a method for dual channel communication for use in the system 100 of FIG. 1 for communication between the mobile device 104 and the remote-SE system 110. Dual channel communication may enable the mobile device 104 and the remote-SE system 110 to communicate using multiple protocols, which may allow for faster and/or more secure transmissions between the two systems.

Dual channel communication may include using remote notification 402 as a first channel, and mutual authentication 404 as a second channel. Remote notification 402 may be performed between the remote notification service 114 and the mobile device 104. In some embodiments, the payment credentials management service 112 may generate information, such as the single use key 118, to be provided to the mobile payment application 106. The payment credentials management service 112 may generate a message including the single use key encrypted with a random key to be provided and may encrypt the message using the mobile key.

The remote notification service 114 may then transmit the message to the mobile device 104 using remote notification. The mobile device 104 may provide the message to the mobile payment application 106, which may then decrypt the message using the shared mobile key, and then may decrypt the encrypted single use key with the random key, and thus use the single use key in a payment transaction. Methods for transmission of message using remote notification will be apparent to persons having skill in the relevant art.

Mutual authentication 404 may be used in instances where additional security may be desired, such as in forming an initial connection between the mobile device 104 and the remote-SE system 110. The mutual authentication 404 may use SSL/TLS communication to authenticate the remote-SE system 110 to the mobile device 104, and may use an authentication code, discussed in more detail below, to authenticate the mobile device 104 to the remote-SE system 110. In such an instance, the authentication of both systems to the other provides the mutual authentication and additional security.

SSL/TLS communication is a standard method of communication as will be apparent to persons having skill in the relevant art. The authentication code may be a hash computed over a set of data known by both the remote-SE system 110 and the mobile device 104. For example, the authentication code may be computed over a unique identifier defined by the remote-SE system 110 to uniquely identify the mobile device 104, which may be provided to the mobile payment application 106 during initialization, discussed in more detail below. In an exemplary embodiment, the authentication code may be based on, in part, a session identifier. The session identifier may be transmitted from the remote-SE system 110 to the mobile device 104 using remote notification 402. In a further embodiment, the session identifier may be encrypted (e.g., using the mobile key). In such an embodiment, the mobile key may be used to decrypt the session identifier to be used to build the authentication code to be used for the mutual authentication 404.

The mobile device 104 and the remote-SE system 110 may both include the mobile key to be used as a shared key for the encrypting and decrypting of messages transmitted via remote notification. The mobile payment application 106 may also include a local storage encryption key. The local storage encryption key may be generated by the mobile payment application 106 and used to provide the storage 304 as an encrypted local database. The storage 304 may then store the shared mobile key, received payment credentials, and any additional information in the mobile device 104 to prevent unauthorized access.

Initialization and Use of the Mobile Payment Application

Figure 5:
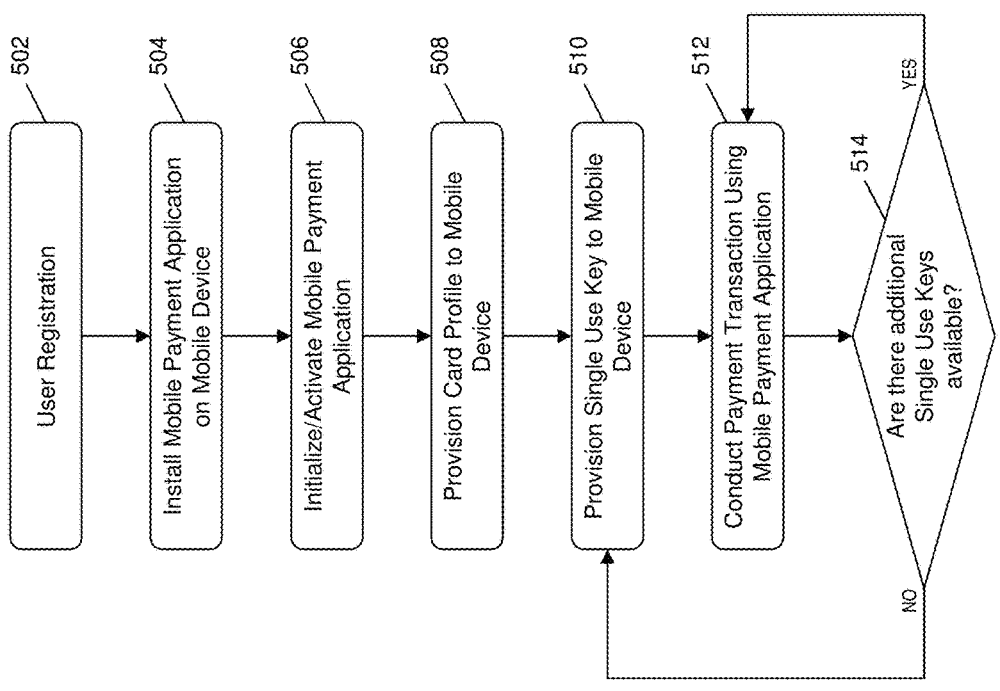
FIG. 5 is a flow chart illustrating the experience of a user of the mobile device of the system of FIG. 1 in accordance with exemplary embodiments.

FIG. 5 illustrates a method 500 for the initialization and use of the mobile payment application 106 in the mobile device 104.

In step 502, the user 102 may register with the remote-SE system 110 to use the mobile device 104 for contactless payment transactions. The user 102 may register with the remote-SE system 110 using the mobile device 104 or another computing device, such as a desktop computer. Registration may be performed via a web browser, application program, or any other suitable method as will be apparent to persons having skill in the relevant art. As part of the registration, the user 102 may provide account information for the payment account with which the user 102 wants to use for payment transactions using the mobile device 104. The user 102 may receive an activation code and may also identify and/or receive a unique identifier used to identify the user 102.

In step 504, the user 102 may install the mobile payment application 106 on the mobile device 104. Methods for installing application programs on a mobile device will be apparent to persons having skill in the relevant art and may include using a web browser or application program on the mobile device 104 to identify and download the mobile payment application 106. It will also be apparent to persons having skill in the relevant art that step 504 may be performed before or concurrently with step 502.

In step 506, the user 102 may initialize/activate the mobile payment application 106. The user 102 may enter the activation code received in step 502 into the mobile payment application 106. The mobile payment application 106 may then communicate with the remote-SE system 110 and may receive the shared mobile key. The mobile payment application 106 may also generate the local storage encryption key and encrypt the storage 304 to create the local encrypted database.

In step 508, the remote-SE system 110 may transmit the card profile 116 to the mobile device 104. In one embodiment, the mobile device 104 may receive a remote notification message to notify the user 102 that the mobile payment application 106 must connect with the remote-SE system 110 using mutual authentication 404. Once connected, the remote-SE system 110 may then transmit the card profile including payment credentials for the account specified by the user 102 in step 502, which may then be stored by the mobile payment application 106 in the local encrypted database 304.

In step 510, the remote-SE system 110 may transmit a single use key 118 to the mobile payment application 106. In some embodiments, the transmission may be performed using mutual authentication 404 in the same process performed in step 510. In some embodiments, steps 508 and 510 may be combined in a single step, such that the remote-SE system may transmit both the card profile 116 and a single use key 118 to the mobile payment application 106 in a single or consecutive transactions.

In step 512, the mobile device 104 may conduct a contactless/NFC payment transaction using the mobile payment application 106 and the single use key 118. The mobile payment application 106 may generate a payment cryptogram, discussed in more detail below, and may transmit the generated cryptogram and payment credentials to a point-of-sale terminal 120. Methods for transmitting payment credentials and a payment cryptogram to a point-of-sale terminal 120 via NFC will be apparent to persons having skill in the relevant art.

In step 514, the mobile payment application 106 may identify if there are any single use keys 118 available for use in subsequent payment transactions. If there are additional keys 118 available for use, then the method 500 may return to step 512 where additional payment transactions may be conducted with the remaining single use key(s) 118. If there are no single use keys 118 remaining, then, the method 500 may return to step 510 where connection may be made with the remote-SE system 110 and a new single use key 118 provisioned to the mobile device 104.

Method for Provisioning Payment Credentials and Generating a Payment Cryptogram

Figure 6:
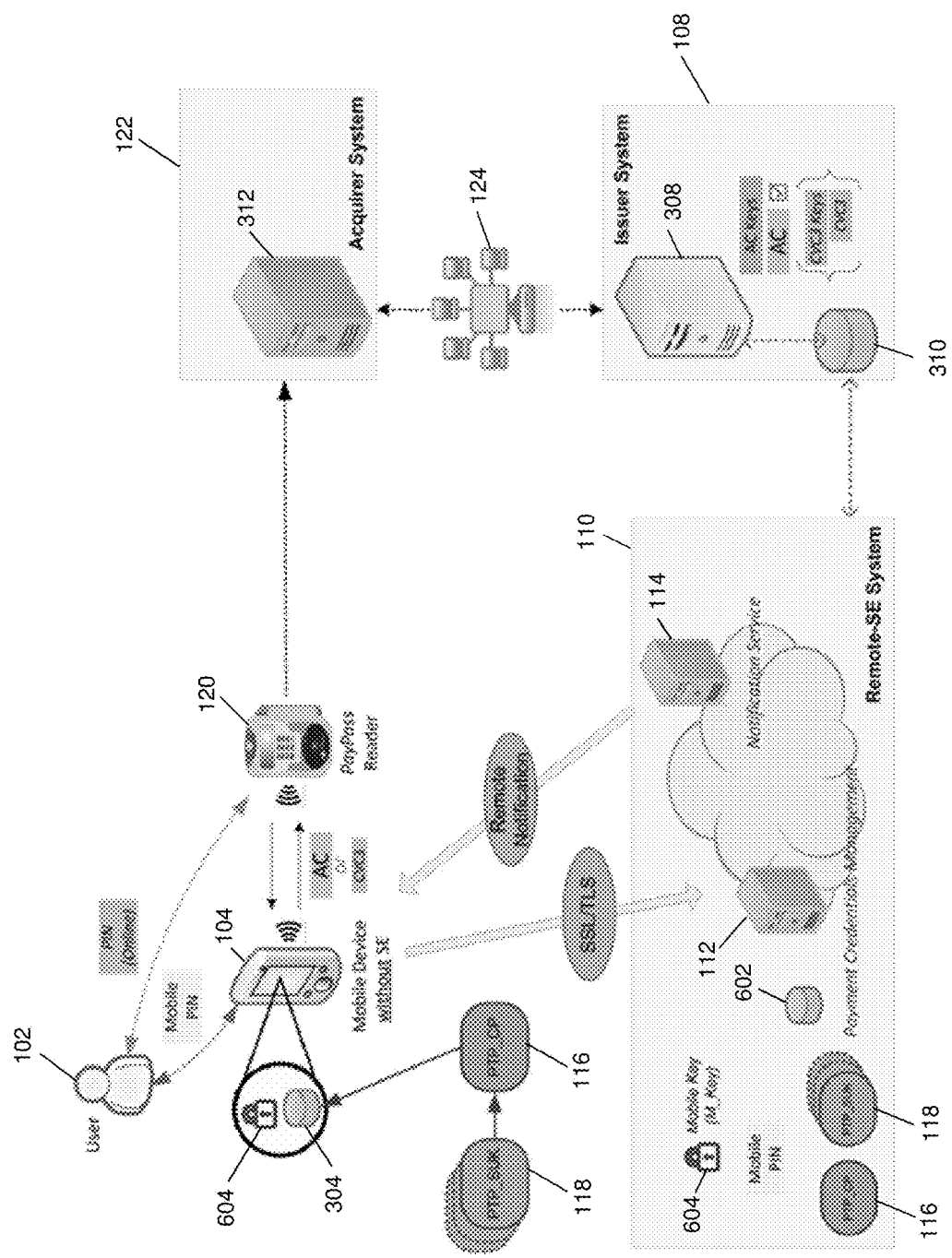
FIG. 6 is a high level diagram illustrating methods for provisioning payment credentials to a mobile device and generating a payment cryptogram in accordance with exemplary embodiments.

FIG. 6 illustrates a more detailed version of the system 100 and illustrates the process by which payment credentials may be generated and provisioned to the mobile device 104 and the mobile device 104 used to conduct a contactless payment transaction without the use of a secure element.

The user 102 may register with the remote-SE system 110. The remote-SE system 110 may store the user registration information (e.g., payment account information) in a database 602 and may return an activation code to the user 102. The user 102 may then install the mobile payment application 106 on the mobile device 104 and activate the mobile payment application 106 using the activation code. As part of the activation, the remote-SE system 110 may transmit a shared mobile key 604 to the mobile payment application 106. The mobile payment application 106 may also generate a local storage encryption key and may encrypt the storage 304 on the mobile device 104. The mobile key 604 may be stored in the local encrypted database 304.

The payment credentials management service 112 may store the shared mobile key 604 in the database 602. The payment credentials management service 112 may also identify payment credentials corresponding to the payment account indicated by the user, and build the card profile 116 including the payment credentials. The remote notification service 114 may transmit a remote notification to the mobile device 104 to indicate to the user 102 that the card profile 116 is ready to be downloaded to the mobile payment application 106. The mobile payment application 106 may then communicate with the payment credentials management service 112 using mutual authentication and receive the card profile 116 from the remote-SE system. The mobile payment application 106 may then store the received card profile 116 in the local encrypted database 304.

The payment credentials management service 112 may also generate a single use key 118 including a generating key. In some embodiments, the single use key 118 may be generated in response to the receipt of a key request from the mobile device 104. In a further embodiment, the key request may include a mobile PIN. The payment credentials management service 112 may have previously stored the mobile PIN (e.g., as set by the user 102) in the database 602.

The payment credentials management service 112 may then transmit the generated single use key 118 to the mobile device 104, which may then store the single use key 118 in the local encrypted database 304. In some instances, the single use key 118 may be incorrect (e.g., fake, not genuine, etc.) if the key request includes a mobile PIN for which authentication is unsuccessful. In some embodiments the key may have been combined with the PIN such that when used it is incorrect without any explicit authentication step. In some embodiments, the card profile 116 and/or the single use key 118 may be encrypted by the payment credentials management service 112 prior to transmission to the mobile device 104, such as by using the mobile key 604. The mobile payment application 106 may then decrypt the received message, also using the shared mobile key 604, or, in some embodiments, a random key.

Once the mobile payment application 106 includes both the card profile 116 and the single use key 118, the user 102 may shop at a merchant 306 and select goods or services for purchase. The user 102 may then input to the mobile payment application 106 that a payment transaction is to be conducted. The mobile payment application 106 may then generate a payment cryptogram using the generating key included in the single use key 118. The payment cryptogram may be, for example, an application cryptogram or a dynamic card validation code (CVC3). The mobile payment application 106 may transmit the payment cryptogram to the merchant point-of-sale terminal 120.

The merchant point-of-sale terminal 120 may transmit the received payment information and any additional transaction information (e.g., transaction amount, merchant identifier, etc.) to the acquirer processing server 312 of the acquirer 122. The acquirer processing server 312 may then generate and submit an authorization request for the financial transaction to the payment network 124. The payment network 124 may transmit relevant transaction data, such as the payment information and transaction amount, to the issuer processing server 308. The issuer processing server 308 may then validate the application cryptogram. If the validation is successful, the issuer may approve the payment transaction for the transaction amount (e.g., based on an available amount, credit, etc. for the payment account). If the validation is unsuccessful, the issuer may deny the payment transaction. Methods for validating a cryptogram will be apparent to persons having skill in the relevant art.

In some embodiments, the remote-SE system 110 may transmit information to the issuer 108 for storage in the issuer database 310, such as for fraud management. Such information will be apparent to persons having skill in the relevant art and may include, for example, application transaction counters. Methods suitable for performing the functions as disclosed herein are discussed in more detail below with respect to the flow diagrams illustrated in FIGS. 8-14.

Figure 7:
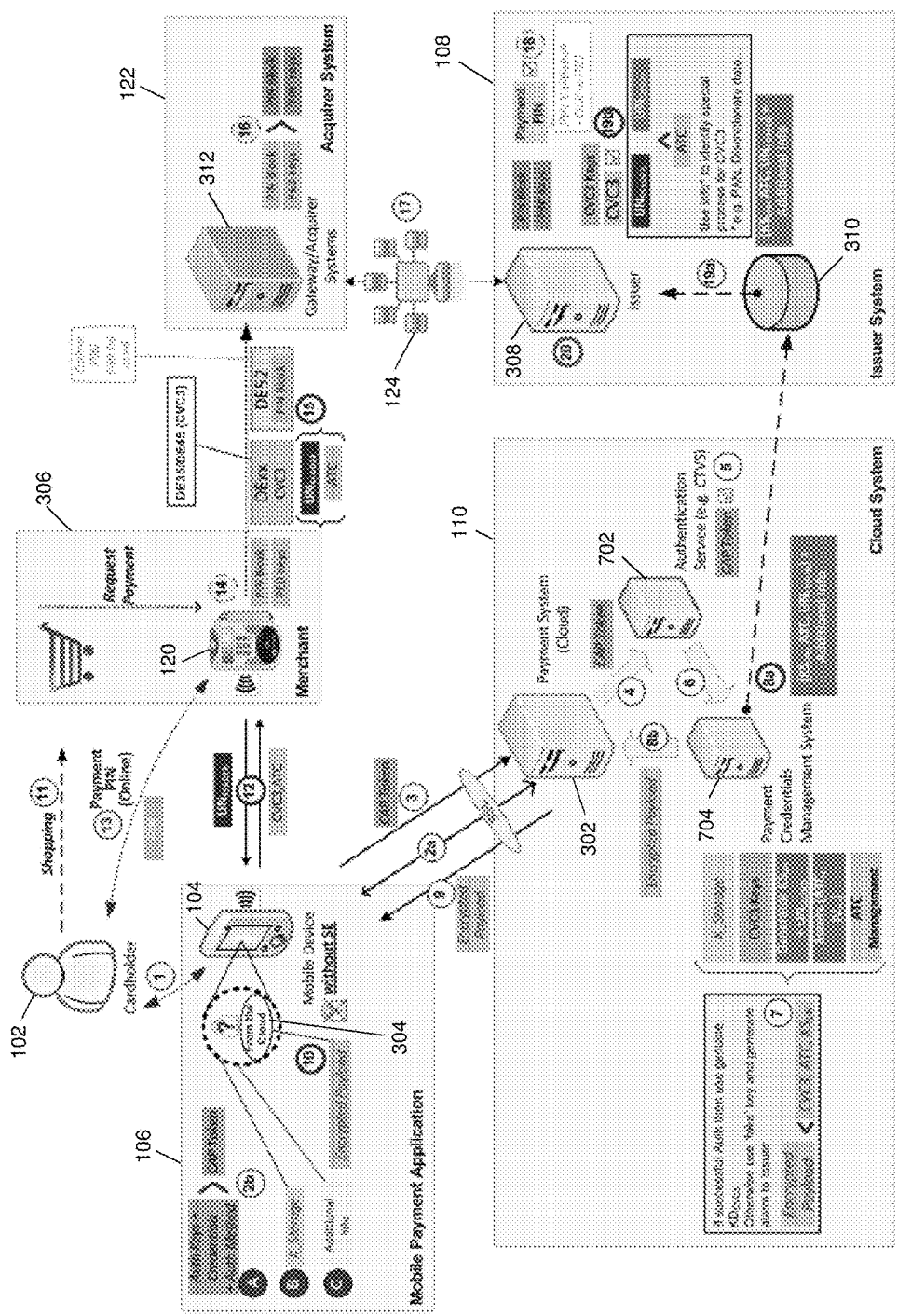
FIG. 7 is a high level diagram illustrating methods for provisioning payment credentials to a mobile device and generating a dynamic card validation code in accordance with exemplary embodiments.

Alternative Method for Provisioning Payment Credentials and Generating a Payment Cryptogram FIG. 7 illustrates a more detailed version of the alternative system 300 and illustrates the process by which payment credentials may be generated and provisioned to the mobile device 104 and the mobile device 104 used to conduct a contactless payment transaction without the use of a secure element.

The user 102 may install the mobile application program 106 on the mobile device 104. Prior to the beginning of the process, at stage A, the mobile application program 106 may store authentication keys and credentials in the storage 304 as received from the remote-SE system 110. At stage B, a storage key ($K_{STORAGE}$) may be stored in the storage 304 as well. At stage C, additional information, including static payment credentials, may be stored in the storage 304.

At stage 1, the user 102 may launch the mobile payment application 106 using the mobile device 104. At stage 2a, the mobile payment application 106 may connect with the remote-SE system 110 via the cloud system 302, such as by using SSL authentication or any other suitable method for authenticated transmission. The cloud system 302 may transmit payment credentials to the mobile payment application 106, which may then be stored in the storage 304. At stage 2b, the mobile payment application 106 may generate a CAP token used for authentication. In some embodiments, the user 102 may supply additional authentication credentials, such as a gesture, a password, or a biometric identifier.

In stage 3, the mobile payment application 106 may transmit the generated CAP token to the remote-SE system 100. At stage 4, the CAP token may be forward to a CAP token validation service (CTVS) 702. At stage 5, the CTVS 702 may validate the CAP token using methods apparent to persons having skill in the relevant art. At stage 6, the results of the validation may be sent to the payment credentials management system 704. In some embodiments, the payment credentials management system 704 may be operated by or on behalf of the issuer 108.

At stage 7, the payment credentials management system 704 may generate an encrypted payload. As part of the encrypted payload, the payment credentials management system 704 may generate a session key unpredictable number ($KS_{UN}$), a cloud unpredictable number ($UN_{CLOUD}$), and may identify and/or store a plurality of dynamic card validation code (CVC3) keys and the $K_{STORAGE}$. Methods and systems for the generation of unpredictable numbers will be apparent to persons having skilled in the relevant art. The encrypted payload may include at least one CVC3 key, the KSUN, and the application transaction counter and may be generated using a derived CVC3 key ($KD_{CVC3}$). In one embodiment, the $KD_{CVC3}$ used may be fake if the CAP token validation is unsuccessful. The payload may be encrypted using the $K_{STORAGE}$.

At stage 8a, the payment credentials management system 704 may perform a synchronization process with the issuer 108. The synchronization process may include defining rules for the validity of the values generated by the mobile payment application 106 for conducting a payment transaction. In one embodiment, the process may include transmitting at least the $KS_{UN}$, application transaction counter, and $UN_{CLOUD}$ to the issuer 108 for storage in the issuer database 310.

At stage 8b, the encrypted payload may be transmitted to the cloud system 302 for transmitting to the mobile payment application 106 in stage 9. At stage 10, the encrypted payload may be decrypted using the $K_{STORAGE}$ and stored in the storage 304. At stage 11, the user 102 may shop at the merchant 306 and select goods or services for purchase. As part of the purchase, at stage 12, the mobile payment application 106 may generate a payment CVC3 value. In one embodiment, the mobile device 104 may communicate with the point-of-sale terminal 120. The point-of-sale terminal 120 may generate a reader unpredictable number ($UN_{READER}$) and transmit the $UN_{READER}$ to the mobile payment application 106, which may then generate the payment CVC3 value using the information in the encrypted payload and the $UN_{READER}$. The generated payment CVC3 value and the application transaction counter may be transmitted to the point-of-sale terminal 120 via NFC.

In some embodiments, the user 102 may be required to enter a PIN at the point-of-sale terminal 120 for additional authentication at stage 13. At stage 14, the point-of-sale terminal 120 may execute standard NFC payment transaction processes as will be apparent to persons having skill in the relevant art. At stage 15, the point-of-sale terminal 120 may generate an authorization request for the payment transaction, which may include the $UN_{READER}$, the generated CVC3 value, the application transaction counter, and, if applicable, the PIN value input by the user 102. At stage 16, the acquirer processing server 312 may translate the PIN included in the authorization request using methods apparent to persons having skill in the relevant art. It will be further apparent that stage 16 may be optional.

At stage 17, the authorization request may be forwarded to the payment network 124, which may forward the authorization request and/or information included in the authorization request to the issuer 108. At optional stage 18, the issuer may verify the translated PIN. At stage 19a, the issuer 108 may identify if additional processing is necessary and may, if necessary, retrieve the values stored in the issuer database 310. At stage 19b, the issuer processing server 308 may validate the payment CVC3 value using at least the $UN_{READER}$, $UN_{CLOUD}$, and application transaction counter. Methods for validating a CVC3 will be apparent to persons having skill in the relevant art. At stage 20, the issuer 108 may submit a response based on the validation, and the method may proceed accordingly as in traditional payment transactions.

Method for Registration of a User for Remote Payment Transactions

Figure 8:
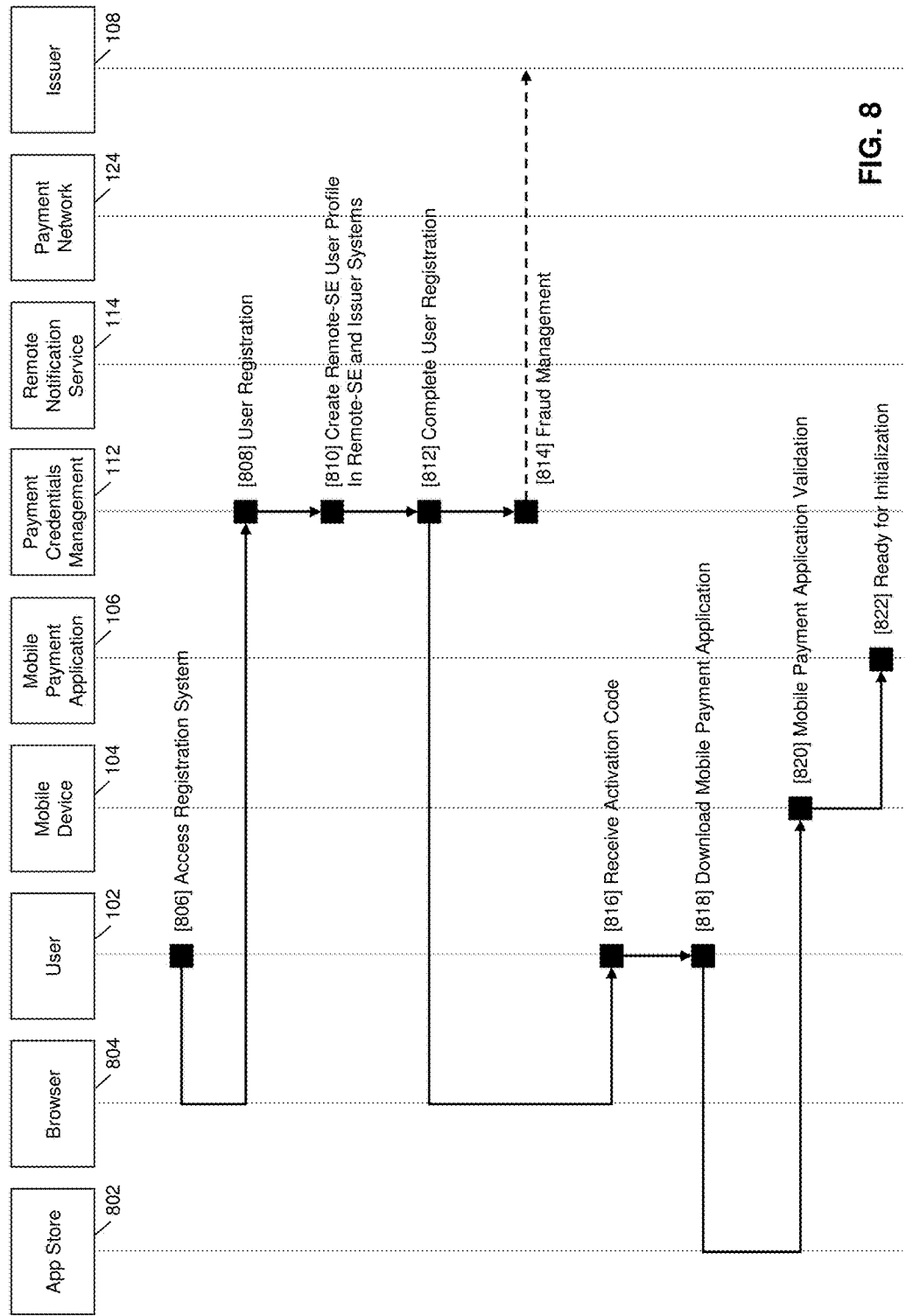
FIG. 8 is a flow diagram illustrating a method for registration of a mobile device for use in the system of FIG. 1 in accordance with exemplary embodiments.

FIG. 8 is a flow diagram illustrating a method for the user 102 to register with the remote-SE system 110 to enable a payment account for remote payment transactions using a mobile device 104 lacking a secure element.

At step 806, the user 102 may access the registration system of the remote-SE system 110. The user 102 may access the system via a web browser 804, which may be executed on a computing device. In one embodiment, the computing device may be the mobile device 104. The user 102 may navigate to a webpage hosted by or on behalf of the remote-SE system 110. At step 808, the user 102 may register with the payment credentials management service 112 via the browser 804. As part of the registration, the user 102 may provide account details for a payment account, and the payment credentials management service 112 may ensure the payment account is eligible for remote payment transactions.

At step 810, the payment credentials management service 112 may create a user profile for the user 102 in the remote-SE system 110. In some embodiments, a user profile may also be created in the issuer system 108. As part of the creation of the user profile, the payment credentials management service 112 may generate and/or identify an activation code. At step 812, the user registration may be completed and the activation code transmitted back to the 102 via the browser 804. At step 814, the payment credentials management service 112 may synchronize information (e.g., the user profile, activation code status, etc.) with the issuer 108 for fraud management. It will be apparent to persons having skill in the relevant art that step 814 may be optional.

At step 816, the user 102 may receive the activation code via the web browser 804. At step 818, the user 102 may download the mobile payment application 106 to the mobile device 104. In one embodiment, the user 102 may utilize an app store 802, such as the Apple® App Store, to download the mobile payment application 106. The mobile payment application 106 may be validated and installed on the mobile device at step 820 using methods and systems apparent to persons having skill in the relevant art. At step 822, the mobile payment application 106 may be successfully installed on the mobile device 104 and may await initialization.

Method for Initialization of the Mobile Payment Application

Figure 9:
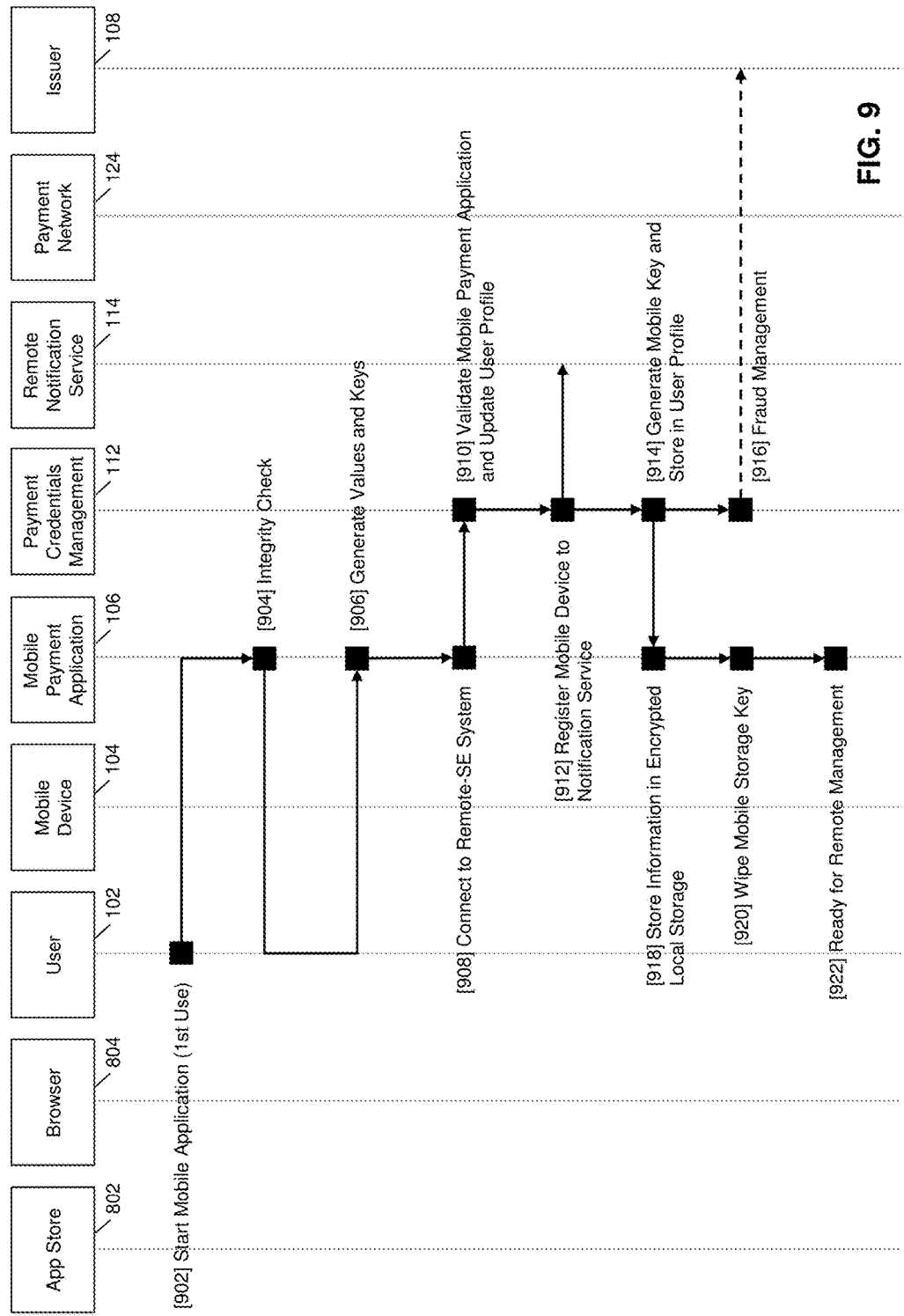
FIG. 9 is a flow diagram illustrating a method for the initialization of a mobile application program on the mobile device of the system of FIG. 1 in accordance with exemplary embodiments.

FIG. 9 is a flow diagram illustrating a method for initialization of the mobile payment application 106 on the mobile device 104 for use in contactless payment transactions.

At step 902, the user may start (e.g., execute) the mobile payment application on the mobile device 104. At step 904, the mobile payment application 106 may perform an integrity check. As part of the integrity check, the mobile payment application 106 may authenticate the user 102 and request the activation code provided to the user 102 during the registration process (e.g., at step 812 in FIG. 8). At step 906, the mobile payment application 106 may generate a unique identifier and additional values and keys, such as a local database storage key (e.g., mobile storage key).

At step 908, the mobile payment application 106 may connect to the payment credentials management service 112 using mutual authentication. The mobile payment application 106 may transmit the activation code and any other additional user authentication information (e.g., a user identifier, a password, etc.) as a method of authentication. The mobile payment application 106 may also transmit the generated unique identifier. In some embodiments, the user 102 may also provide a mobile PIN to be transmitted to the payment credentials management service 112 as part of step 908.

At step 910, the payment credentials management service 112 may validate the mobile payment application 106 using the provided authentication information and may, if validated, update the user profile to include the unique identifier. At step 912, the payment credentials management service 112 may also register the mobile device 104 with the remote notification service 114 using the unique identifier. At step 914, the payment credentials management service 112 may generate the shared mobile key 604 and may store the shared mobile key 604 in the user profile. At optional step 916, the payment credentials management service 112 may synchronize with the issuer 108 for fraud management.

At step 918, the mobile payment application 106 may receive the shared mobile key 604 from the payment credentials management service 112 and may store the mobile key 604 in the encrypted local storage 304. At step 920, the mobile payment application 106 may wipe the mobile storage key, such that the encrypted local storage 304 may not be access without authorization. The mobile payment application 106 may store data with which the mobile storage key is generated separate from the encrypted local storage 304 for use in regenerating the mobile storage key for access to the encrypted local storage 304. At step 922, the mobile payment application 106 may be ready for remote management by the payment credentials management service 112. In some embodiments, the mobile payment application 106 may notify the user 102 when initialization is completed.

Method for Remote Management of the Mobile Payment Application

Figure 10:
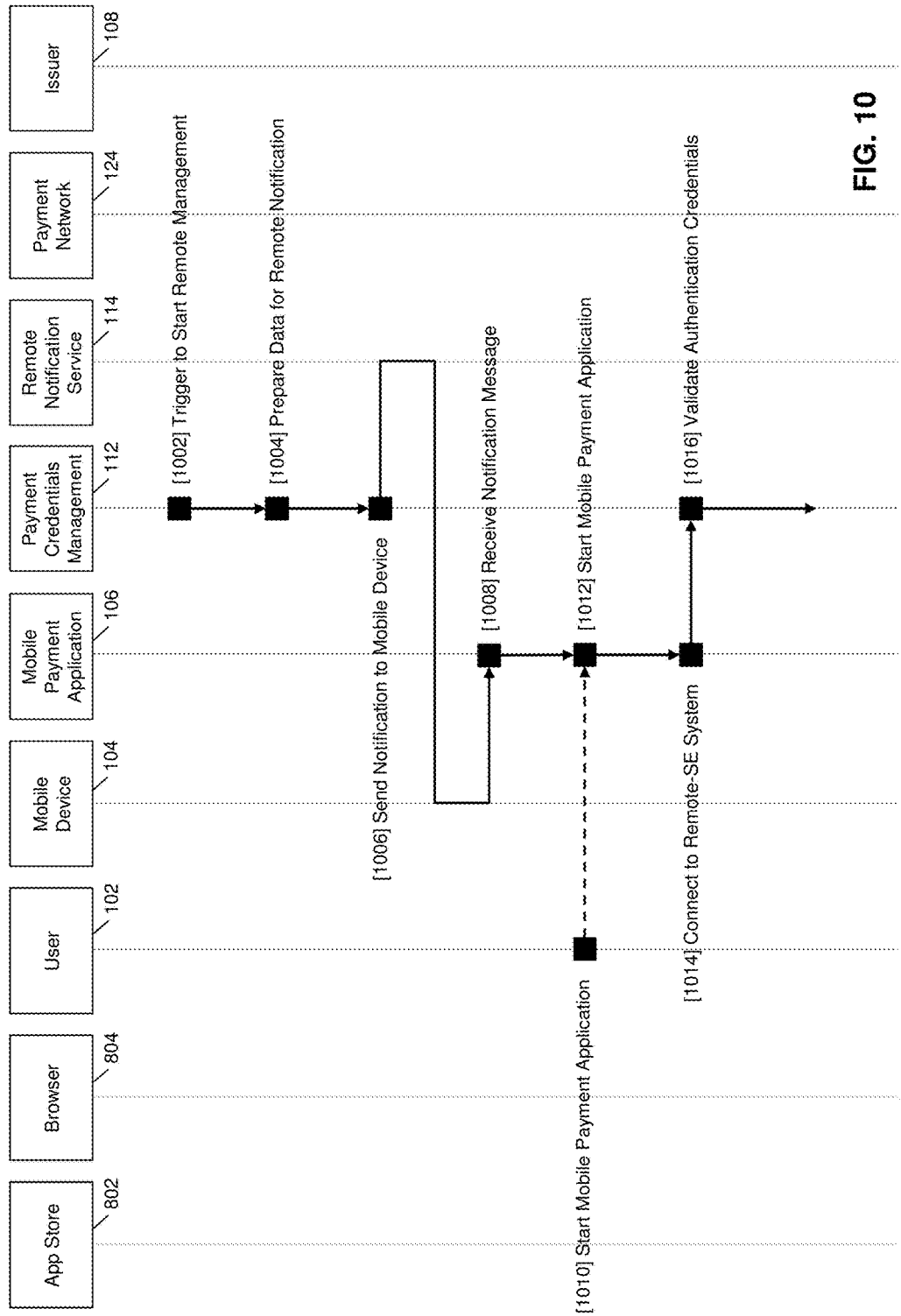
FIG. 10 is a flow diagram illustrating a method for remote management of the mobile application program of the mobile device in accordance with exemplary embodiments.

FIG. 10 is a flow diagram illustrating a method for remote management of the mobile payment application 106 of the mobile device 104 via the payment credentials management service 112.

In step 1002, the payment credentials management service 112 may receive a trigger to start the remote management of the mobile payment application 106. In some embodiments, the trigger may be received from the payment credentials management service 112 itself based on predefined rules. In another embodiment, the trigger may be received from the issuer 108. In step 1004, the payment credentials management service 112 may prepare data for remote notification. The preparation of data may include the building of a notification based on a function to be performed, such as the provisioning of the card profile 116, provisioning of a single use key 118, changing of the mobile PIN, etc. An exemplary method for provisioning of the card profile 116 to the mobile device 104 is discussed in more detail below with reference to FIG. 11.

The payment credentials management service 112 may build a message including the notification and a session identifier, and then may encrypt the message using the mobile key 604. The payment credentials management service 112 may also identify the mobile device 104 for receipt using the unique identifier in the user profile. In embodiments where step 1004 may include the provisioning of the single use key 118, the single use key 118 may be encrypted using a random key (e.g., or suitable key other than the mobile key 604), and then the encrypted single use key may be encrypted using the mobile 604 and provisioned to the mobile payment application 106 similar to the encryption and transmission of the message as disclosed herein.

In step 1006, the payment credentials management service 112 may transmit the encrypted message to the mobile payment application 106 using remote notification 402. As discussed above, remote notification 402 may include the forwarding of the encrypted message to the remote notification service 114, which may transmit the encrypted message to the mobile device 104 using remote notification, which may then make the encrypted message available to the mobile payment application 106. In step 1008, the mobile payment application 106 may receive the encrypted message.

In step 1010, the user 102 may start the mobile payment application 106. It will be apparent to persons having skill in the relevant art that step 1010 may be optional (e.g., the mobile payment application 106 may start upon receipt of the encrypted message, the mobile payment application 106 may always run in the background, etc.). In step 1012, the mobile payment application 106 may start, which may include regenerating the mobile storage key, retrieving the mobile key 406 from the local encrypted storage 304, and decrypting the message using the retrieved mobile key 406.

In step 1014, the mobile payment application 106 may connect to the payment credentials management service 112 using mutual authentication 404 as discussed above, such as by generating, transmitting, and then wiping an authentication code including the session identifier. At step 1016, the payment credentials management service 112 may validate the authentication credentials transmitted by the mobile payment application 106. If validated, the payment credentials management service 112 may then have a secure connection with the mobile payment application 106 and may proceed with the function indicated in the notification.

Method for Provisioning of a Card Profile to the Mobile Payment Application

Figure 11:
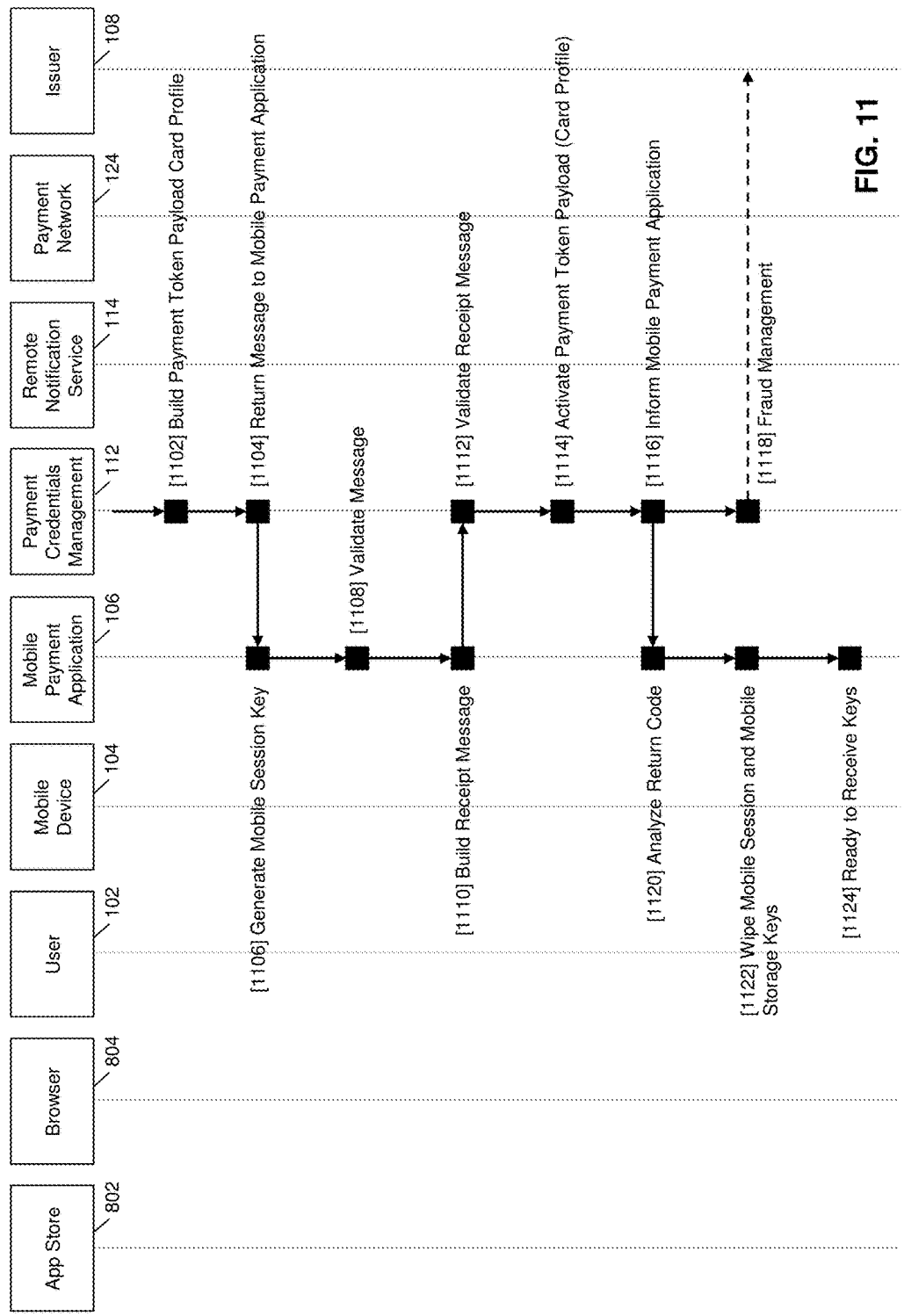
FIG. 11 is a flow diagram illustrating a method for the delivery of a card profile to the mobile device of the system of FIG. 1 in accordance with exemplary embodiments.

FIG. 11 is a flow diagram illustrating a method for provisioning the card profile 116 to the mobile payment application 106 of the mobile device 104 by the payment credentials management service 112.

Utilizing the connection made upon the triggering of remote management illustrated in FIG. 10, at step 1102 the payment credentials management service 112 may build the payment token payload card profile 116. The card profile 116 may include payment credentials for the payment account indicated by the user 102 during registration, which may have been stored in the user profile. The payment credentials management service 112 may build the card profile by generating a message including the payment credentials, generating a mobile session key, and encrypting the message using the mobile session key. The payment credentials management service 112 may store the card profile 116 in the user profile and, in step 1104, may transmit the message including the card profile 116 to the mobile payment application 106.

In step 1106, the mobile payment application 106 may receive the message and may generate the mobile session key used for decrypting the message. At step 1108, the mobile payment application 106 may decrypt the message using the generated mobile session key and may validate the message. Once validated, at step 1110 the mobile payment application 106 may build a receipt message indicating successful receipt and validation of the card profile 116, and may be used as an activation message and/or used to carry information from the mobile payment application 106 to the remote-SE system 110. The receipt message may be encrypted using the mobile session key. The mobile payment application 106 may also update a status to indicate that the card profile 116 is successfully received and stored.

In step 1112, the receipt message may be received by the payment credentials management service 112 and may be decrypted using the mobile session key and validated. Upon successful validation, in step 1114 the payment credentials management service 112 may activate the card profile 116 and may update the user profile accordingly. In step 1116, the payment credentials management service 112 may transmit a notification to the mobile payment application 106 that the card profile 116 has been activated and may wipe the mobile session key. In step 1118, the payment credentials management service 112 may synchronize the user profile indicating activation of the card profile 116 with the issuer 108 for fraud management.

In step 1120, the mobile payment application 106 may analyze the return code indicating activation of the card profile 116. In step 1122, the mobile payment application 106 may wipe the mobile session key, and in step 1124 may be ready to receive single use keys 118 for use in conducting payment transactions. In some embodiments, the mobile payment application 106 may display a notification to the user 102 via a user interface to indicate that single use keys 118 may be received.

Method for Provisioning Single Use Keys to the Mobile Payment Application

Figure 12:
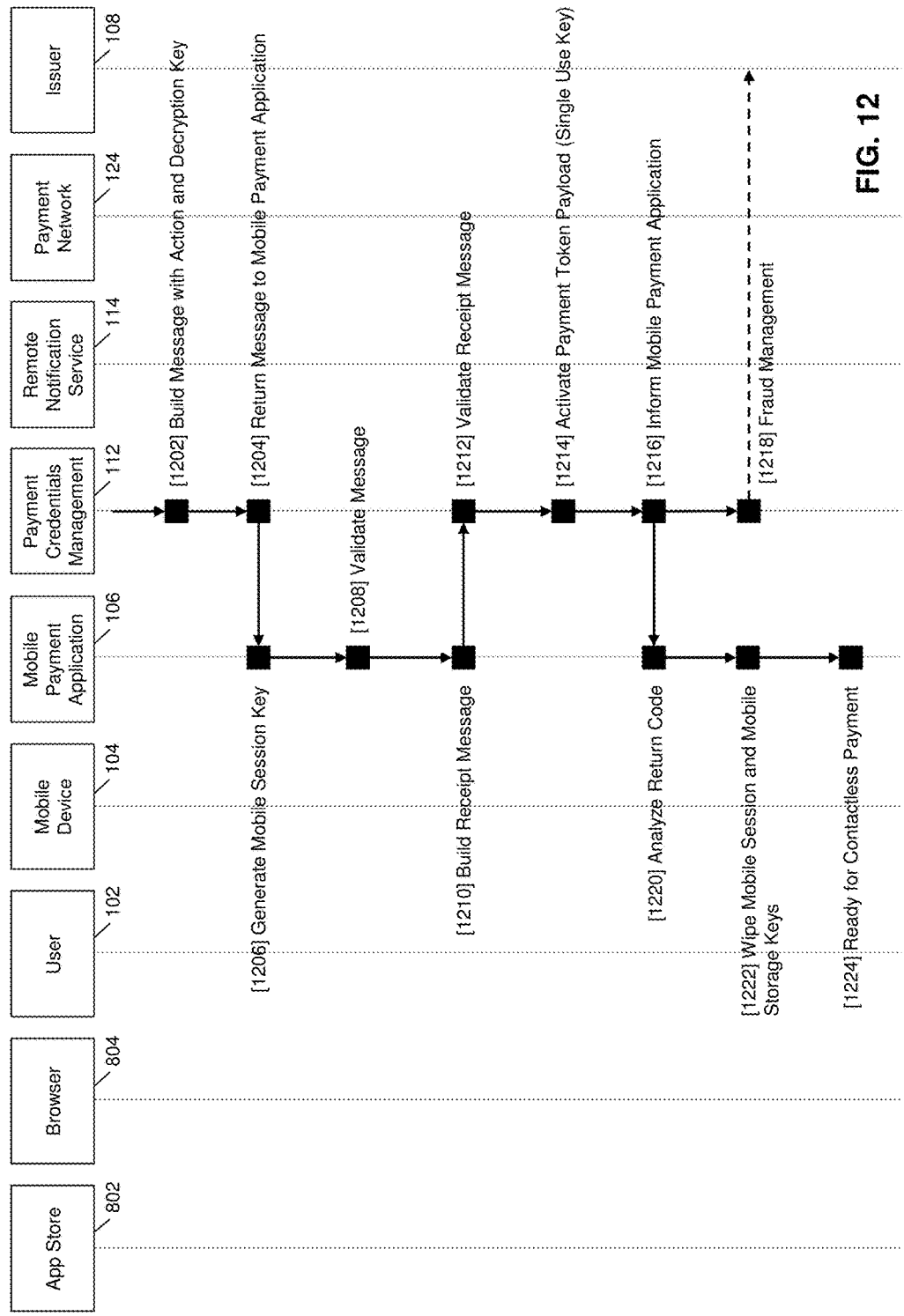
FIG. 12 is a flow diagram illustrating a method for the delivery of a single use key to the mobile device of the system of FIG. 1 in accordance with exemplary embodiments.

FIG. 12 is a flow diagram illustrating a method for the provisioning of single use keys 118 to the mobile payment application 106 in the mobile device 104 by the payment credentials management service 112 for use in payment transactions.

In an exemplary embodiment, while performing the connection with the payment credentials management service 112 made upon the triggering of remote management illustrated in FIG. 10, the encrypted single use key 118, may be previously transmitted to the mobile payment application 106 in a message encrypted by the mobile key 604. At step 1202, the payment credentials management service 112 may build a message with an action to activate (e.g., decrypt) the previously provisioned single use key 118, the message including the random key used to encrypt the single use key 118. The payment credentials management service 112 may then generate a mobile session key and then may encrypt the message including the random key using the mobile session key. The payment credentials management service 112 may then, in step 1204, transmit the message including the random key to the mobile payment application 106.

In step 1206, the mobile payment application 106 may receive the message and may generate the mobile session key used for decrypting the message. At step 1208, the mobile payment application 106 may decrypt the message using the generated mobile session key and may validate the message. The mobile payment application 106 may also decrypt the single use key 118 using the random key included in the decrypted message, and may validate the decrypted single use key 118. Once validated, at step 1210 the mobile payment application 106 may build a receipt message indicating successful receipt and validation of the single use key 118. The receipt message may be encrypted using the mobile session key. The mobile payment application 106 may also update a status to indicate that the single use key 118 is successfully received and stored and that the mobile payment application 106 is ready to conduct a payment transaction.

In step 1212, the receipt message may be received by the payment credentials management service 112 and may be decrypted using the mobile session key and validated. Upon successful validation, in step 1214 the payment credentials management service 112 may activate the single use key 118 and may update the user profile accordingly. In step 1216, the payment credentials management service 112 may transmit a notification to the mobile payment application 106 that the single use key 118 has been activated and may wipe the mobile session key. In step 1218, the payment credentials management service 112 may synchronize the user profile indicating activation of the single use key 118 with the issuer 108 for fraud management.

In step 1220, the mobile payment application 106 may analyze the return code indicating activation of the single use key 118. In step 1222, the mobile payment application 106 may wipe the mobile session key, and in step 1224 may be ready to conduct a contactless payment transaction. In some embodiments, the mobile payment application 106 may display a notification to the user 102 via a user interface to indicate that the mobile payment application 106 is ready to conduct a contactless payment transaction.

Method for Modification of Mobile PIN in the Mobile Payment Application

Figure 13:
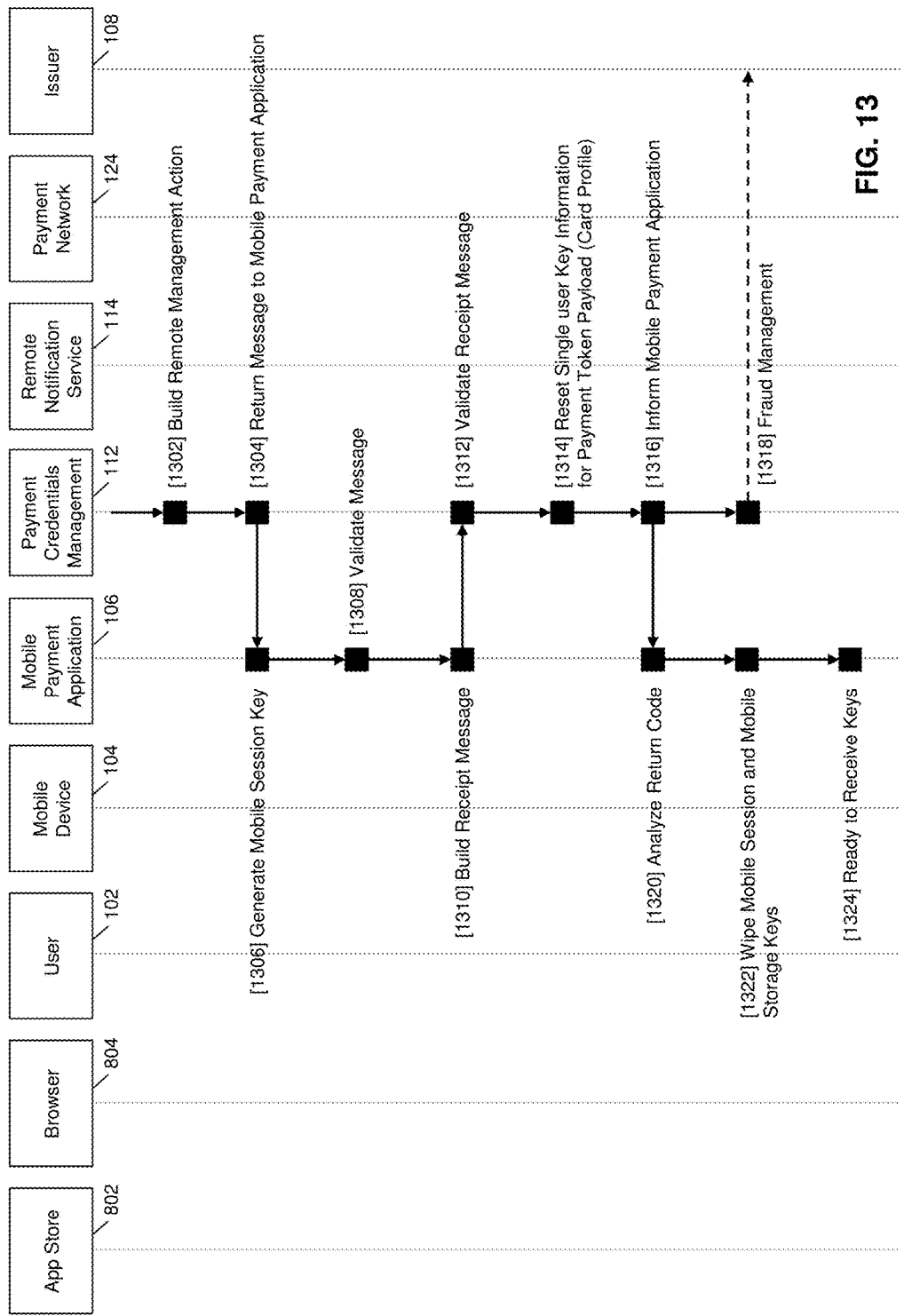
FIG. 13 is a flow diagram illustrating a method for managing the mobile application program following the update of a mobile personal identification number of the mobile device of the system of FIG. 1 in accordance with exemplary embodiments.

FIG. 13 is a flow diagram illustrating a method for the management of a change in the mobile PIN of the user 102 in the mobile payment application 106 by the payment credentials management service 112.

Utilizing the connection made upon the triggering of remote management illustrated in FIG. 10, at step 1302 the payment credentials management service 112 may build a remote management action indicating a change to the mobile PIN and removal of all stored single use keys 118. The payment credentials management service 112 may build a message including the remote management action, generate a mobile session key, and encrypt the message using the mobile session key. The payment credentials management service 112 may, in step 1304, transmit the message including remote management action to the mobile payment application 106.

In step 1306, the mobile payment application 106 may receive the message and may generate the mobile session key used for decrypting the message. At step 1308, the mobile payment application 106 may decrypt the message using the generated mobile session key and may validate the message. Once the message has been validated, the mobile payment application may update the card profile 116 accordingly and may remove any available single use keys 118 from the encrypted local storage 304. Then, at step 1310, the mobile payment application 106 may build a receipt message indicating successful receipt and execution of the remote management action. The receipt message may be encrypted using the mobile session key.

In step 1312, the receipt message may be received by the payment credentials management service 112 and may be decrypted using the mobile session key and validated. Upon successful validation, in step 1314 the payment credentials management service 112 may update the user profile accordingly. In step 1316, the payment credentials management service 112 may transmit a notification to the mobile payment application 106 that the user profile has been updated and no single use keys 118 have been issued, and may wipe the mobile session key. In step 1318, the payment credentials management service 112 may synchronize the user profile indicating the change to the mobile PIN and wiping of single use keys 118 with the issuer 108 for fraud management.

In step 1320, the mobile payment application 106 may analyze the return code. In step 1322, the mobile payment application 106 may wipe the mobile session key, and in step 1324 may be ready to receive single use keys 118 for use in conducting payment transactions. In some embodiments, the mobile payment application 106 may display a notification to the user 102 via a user interface to indicate that single use keys 118 may be received.

Figure 14:
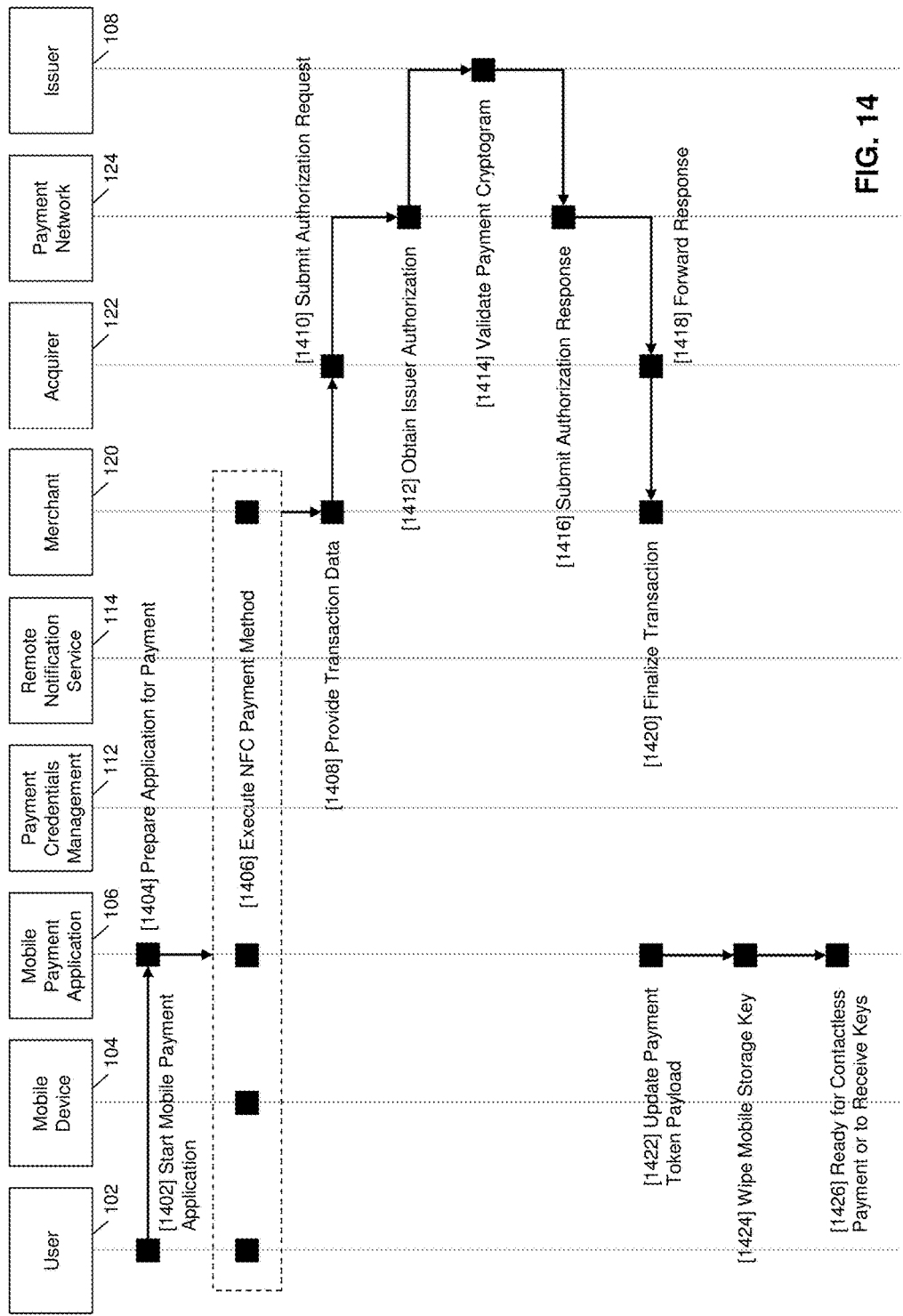
FIG. 14 is a flow diagram illustrating a method for conducting a payment transaction using the mobile device of the system of FIG. 1 in accordance with exemplary embodiments.

Method for Conducting a Payment Transaction Using the Mobile Payment Application FIG. 14 is a flow diagram illustrating a method for conducting a contactless payment transaction using the mobile payment application 106 on the mobile device 104 using the card profile 116 and single use key 118 provisioned by the payment credentials management service 112.

In step 1402, the user 102 may start the mobile payment application 106 on the mobile device 104. In step 1404, the mobile payment application 106 may prepare for payment. To prepare for payment, the mobile payment application 106 may regenerate the mobile storage key and may retrieve the payment credentials and generating key from the card profile 116 and the single use key 118 in the encrypted local storage 304. The generating key may be used by the mobile payment application 106 to generate a payment cryptogram for use in the payment transaction. The mobile payment application 106 may also indicate to the user 102 that the application is ready for payment.

In step 1406, a NFC payment method may be executed between the user 102, the mobile device 104, the mobile payment application 106, and the point-of-sale terminal 120. Methods for executing transmission of payment credentials from a mobile device to a point-of-sale terminal will be apparent to persons having skill in the relevant art.

In step 1408, the point-of-sale terminal 120 at the merchant 306 may provide transaction data to the acquirer 122 including the payment credentials and payment cryptogram. In step 1410, the acquirer 122 may submit an authorization request including the transaction data to the payment network 124. In step 1412, the payment network 124 may seek authorization from the issuer 108 for the payment transaction and may forward relevant information to the issuer 108. In step 1414, the issuer 108 may validate the payment cryptogram using methods that will be apparent to persons having skill in the relevant art. The issuer 108 may, once the payment cryptogram is validated, approve or deny the payment transaction (e.g., based on a transaction amount and available credit in the payment account for the user 102) and notify the payment network 124. At step 1416, the payment network 124 may submit an authorization response to the acquirer 122, which may then forward the response to the merchant 306 and/or point-of-sale terminal 120 at step 1418. At step 1420, the merchant may finalize the payment transaction, such as by providing the transacted goods or services to the user 102 or by providing a receipt to the user 102.

Once the payment transaction has been completed, the mobile payment application 106 may, at step 1422, update the payment token payload stored in the encrypted local storage 304 based on the outcome of the payment transaction. At step 1424, the mobile payment application 106 may wipe the mobile storage key, and at step 1426, may indicate (e.g., to the user 102) that the mobile payment application 106 is ready for another contactless payment transaction (e.g., if additional single use keys 118 are available) or to receive single use keys 118.

In some embodiments, the payment transaction may be conducted via the use of local data authentication (LDA). In some instances, the storage of payment credentials received by the mobile device 104 in the encrypted local storage 304 (e.g., and not in a Secure Element) may be such that CDA (combined dynamic data authentication/application cryptogram generation) may be unavailable to support traditional card verification methods to verify the payment credentials used in the financial transaction. As a result, the point-of-sale terminal 120 may be configured such that it may require authentication by the user 102 at both the mobile device 104 (e.g., entering of the mobile PIN) and the point-of-sale terminal 120 (e.g., entering of an online PIN or signature).

LDA may be used in order to provide card authentication support such that a financial transaction may be supported by the point-of-sale terminal 120 utilizing a single point of authentication (e.g., the mobile PIN). In order to perform LDA, the card profile 116 may further include one RSA key pair and certificate. The performing of the LDA may include the swapping of the meaning of the effective date and the expiration date in the payment credentials included in the card profile 116, and the setting of at least one issuer action code to force the payment transaction to be an online transaction. In a further embodiment, the expiration date may be set as a date prior to the date of issuance, or the effective date may be set as a date beyond the expiry date, or both may be set as defined. This may result in the point-of-sale terminal 120 declining the transaction due to the expiration and/or effective dates, but transmitting the transaction for online authorization, which may result in processing of the transaction using the single point of authentication by the user 102. In a further embodiment, the expiration date may be set as a previous date, or the effective date may be set as a future date, or both may be set as defined. In some embodiments, performing LDA may further include setting an issuer action code configured to decline offline transactions (e.g., such that if the point-of-sale terminal 120 is an offline-only terminal it may decline all such transactions).

It is noted that, although the method illustrated in FIG. 14 and described above is a method for conducting a contactless payment transaction, such a method may also be used for conducting a remote payment transaction, for the secure transmission of payment credentials, for use as part of an authentication solution (whether part of a transaction or otherwise), or in other applications as will be apparent to persons having skill in the relevant art and not limited to those illustrated herein.

Exemplary Method for Generating and Provisioning Payment Credentials

Figure 15:
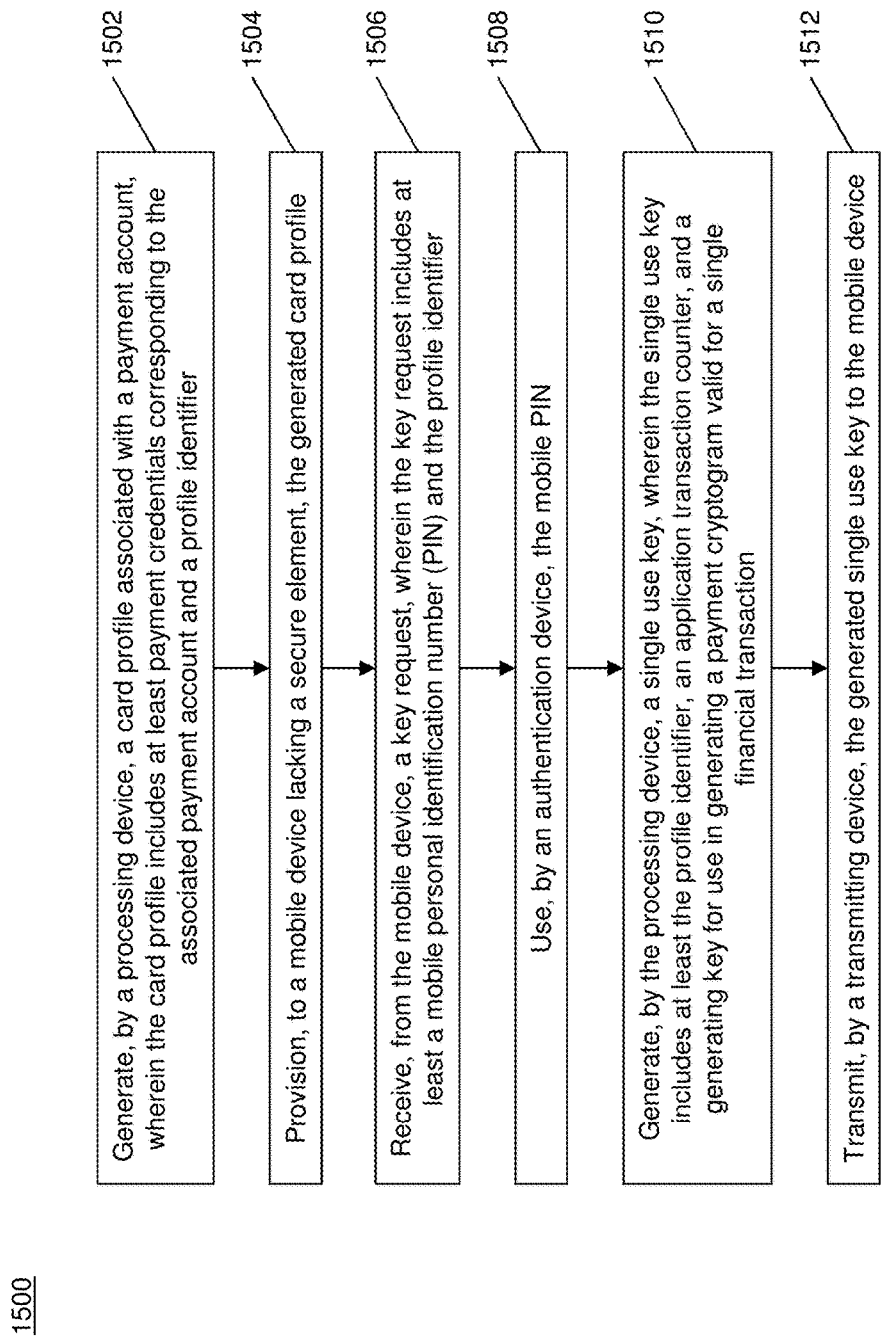
FIG. 15 is a flow chart illustrating an exemplary method for generating and provisioning payment credentials to a mobile device lacking a secure element in accordance with exemplary embodiments.

FIG. 15 is a flow chart illustrating a method 1500 for generating and provisioning payment credentials to a mobile device lacking a secure element.

At step 1502, a card profile (e.g., the card profile 116) associated with a payment account may be generated by a processing device (e.g., of the payment credentials management service 112), wherein the card profile 116 includes at least payment credentials corresponding to the associated payment account and a profile identifier. At step 1504, the generated card profile 116 may be provisioned to a mobile device (e.g., the mobile device 104) lacking a secure element. In one embodiment, provisioning the card profile 116 may include building a message including the generated card profile 116, generating an encryption key, encrypting the message using the generated encryption key, and provisioning the encrypted message to the mobile device 104.

At step 1506, a key request may be received from the mobile device 104, wherein the key request includes at least a mobile personal identification number (PIN) and the profile identifier. At step 1508, an authentication device (e.g., of the payment credentials management service 112) may use the mobile PIN. In one embodiment, the authentication device may use the mobile PIN using an XOR method. At step 1510, a single use key (e.g., the single use key 118) may be generated by the processing device, wherein the single use key 118 includes at least the profile identifier, an application transaction counter, and a generating key for use in generating a payment cryptogram valid for a single financial transaction. In some embodiments, the single use key 118 may be genuine if the mobile PIN is successfully authenticated in step 1508, and fake if the mobile PIN is unsuccessfully authenticated. In one embodiment, the method 1500 may further include transmitting the generated single use key 118 to an issuer associated with the payment account. In some embodiments, the generated single use key 118 may be inactive.

At step 1512, the generated single use key 118 may be transmitted, by a transmitting device, to the mobile device 104. In one embodiment, transmitting the generated single use key 118 may include building a message including the generated single use key 118, generating an encryption key, encrypting the message using the generated encryption key, and provisioning the encrypted message to the mobile device 104.

In embodiments where the generated single use key 118 may be inactive, the method 1500 may further include receiving, from the mobile device 104, and indication of use of the single use key 118 and activating, by the processing device, the generated single use key 118. In a further embodiment, the method 1500 may also include transmitting, by the transmitting device, an indication of activation of the single use key 118 to an issuer (e.g., the issuer 108) associated with the payment account.

Method for Generating a Payment Cryptogram

Figure 16:
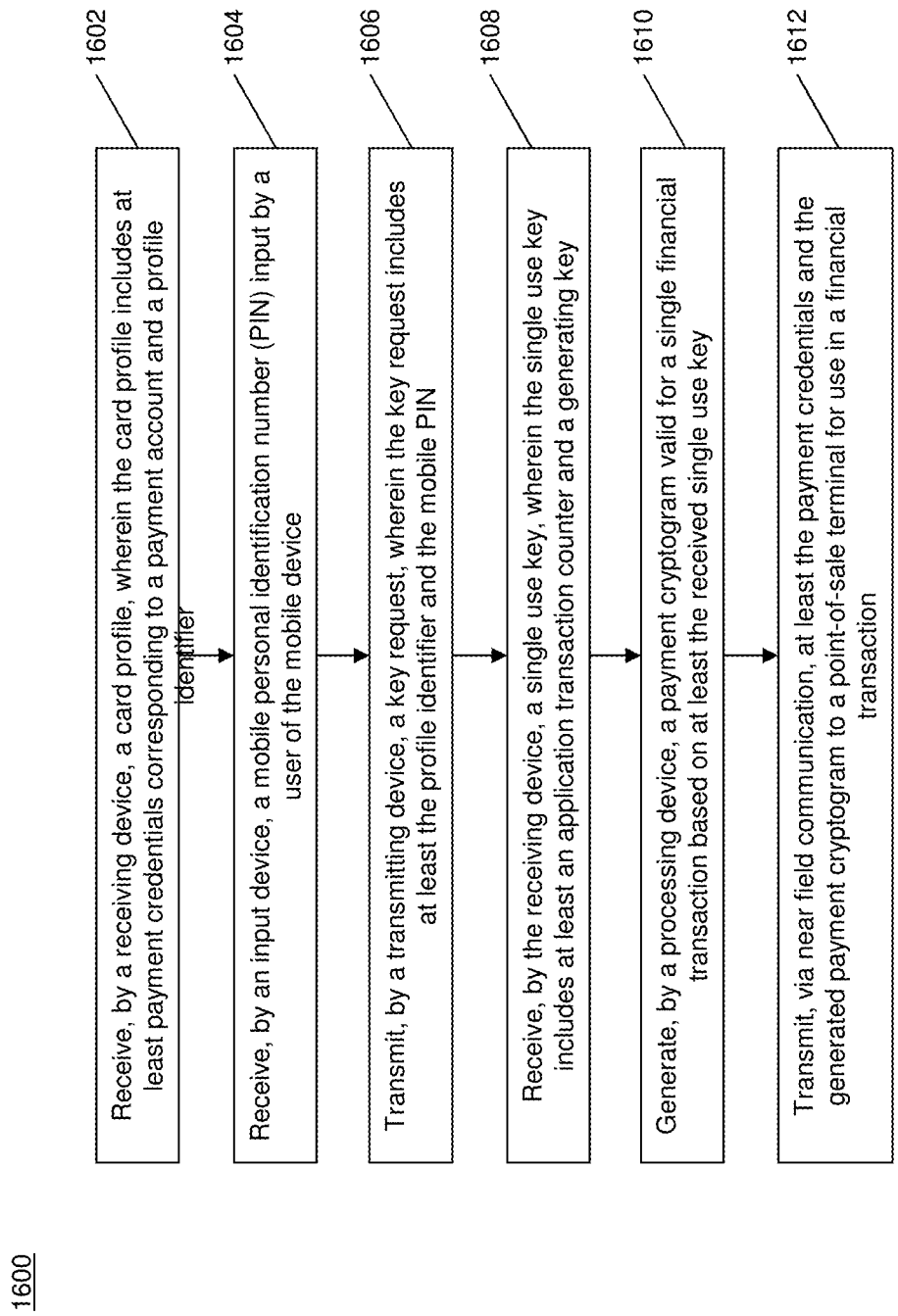
FIG. 16 is a flow chart illustrating an exemplary method for generating a payment cryptogram in a mobile device lacking a secure element in accordance with exemplary embodiments.

FIG. 16 is a flow chart illustrating a method 1600 for generating a payment cryptogram in a mobile device (e.g., the mobile device 104) lacking a secure element.

In step 1602, a card profile (e.g., the card profile 116) may be received by a receiving device (e.g., in the mobile device 104), wherein the card profile 116 includes at least payment credentials corresponding to a payment account and a profile identifier. In one embodiment, receiving the card profile 116 may include receiving an encrypted message including the card profile 116, generating a mobile session key, and decrypting the message using the generated mobile session key to obtain the included card profile 116. In some embodiments, the card profile 116 may be configured to utilize local data authentication, wherein the local data authentication includes swapping, in the payment credentials, the meaning of an expiration date and an effective date, and setting an issuer action code configured to force the financial transaction to be an online transaction. In a further embodiment, the expiration date may be set as a date prior to the date of issuance, or the effective date may be set as a date beyond the expiry date, or both may be set as defined. In a further embodiment, the card profile 116 may further include one RSA key pair and certificate.

In step 1604, an input device (e.g., of the mobile device 104, such as a touch screen) may receive a mobile personal identification number (PIN) input by a user (e.g., the user 102) of the mobile device 104. In step 1606, a transmitting device may transmit a key request, wherein the key request includes at least the profile identifier.

In step 1608, a single use key (e.g., the single use key 118) may be received, by the receiving device, wherein the single use key 118 includes at least an application transaction counter and a generating key. In one embodiment, receiving the single use key 118 may include receiving an encrypted message including the single use key 118, generating a mobile session key, and decrypting the message using the generated mobile session key to obtain the included single use key 118.

In step 1610, a payment cryptogram valid for a single payment transaction may be generated, by a processing device, based on at least the received single use key 108 and the mobile PIN. In some embodiments, the payment cryptogram may be an application cryptogram or a dynamic card validation code. In step 1612, at least the payment credentials and the generated payment cryptogram may be transmitted, via near field communication, to a point-of-sale terminal (e.g., the point-of-sale terminal 120) for use in a financial transaction.

In some embodiments, the method 1600 may further include receiving, by the input device, an indication of use of the received single use key 118, transmitting, by the transmitting device, an activation request including at least the profile identifier, and receiving, by the receiving device, an indication of activation of the single use key 118. In a further embodiment, the payment credentials and generated payment cryptogram may be transmitted to the point-of-sale terminal 120 in response to receiving the indication of activation of the single use key 118. In an alternative further embodiment, the payment cryptogram may be generated in response to receiving the indication of activation of the single use key 118.

Alternative Method for Generating and Provisioning Payment Details

Figure 17:
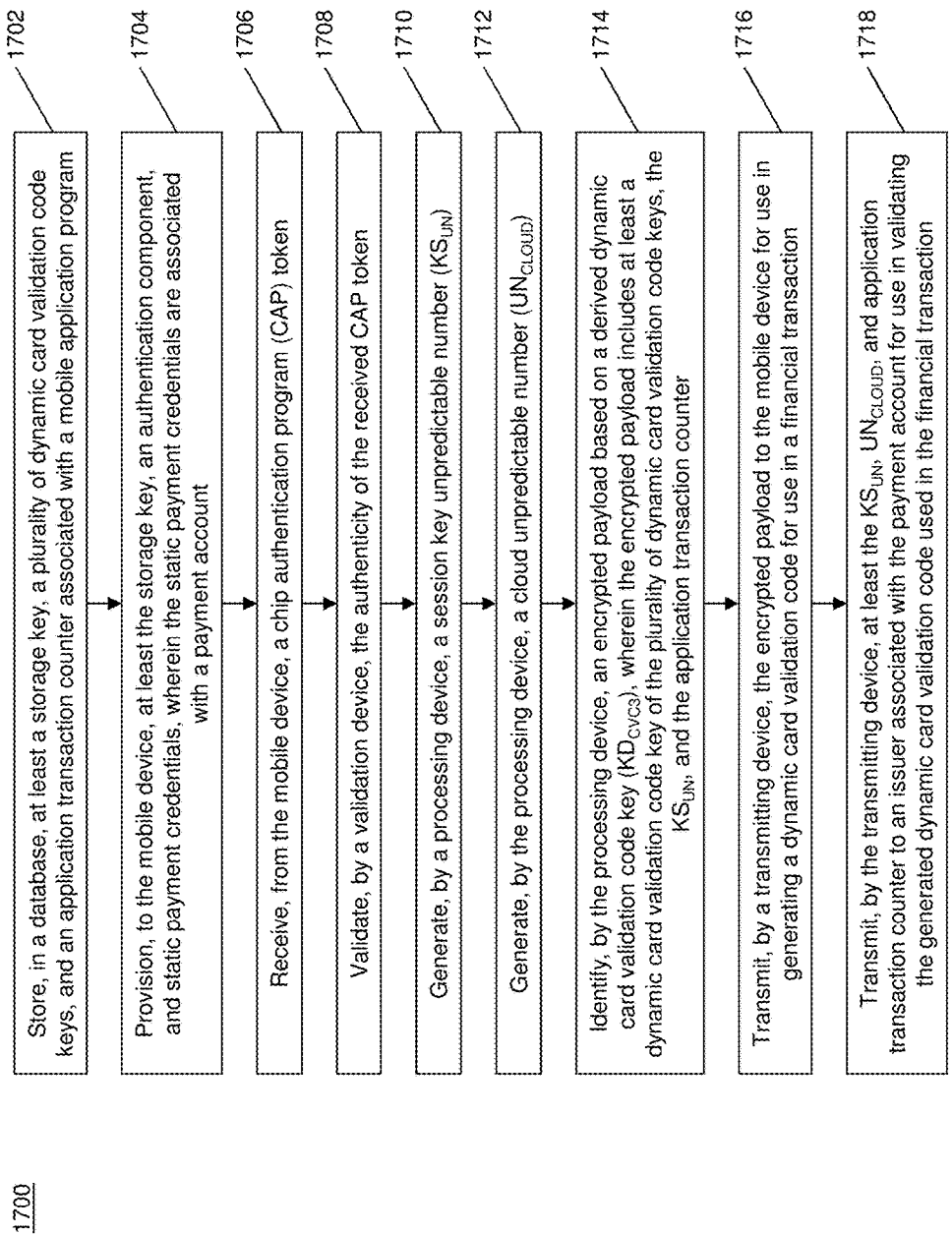
FIG. 17 is a flow chart illustrating an alternative method for generating and provisioning payment credentials to a mobile device lacking a secure element in accordance with exemplary embodiments.

FIG. 17 is a flow chart illustrating an alternative method 1700 for generating and provisioning payment details to a mobile device (e.g., the mobile device 104) lacking a secure element.

In step 1702, at least a storage key, a plurality of dynamic card validation code (CVC3) keys, and an application transaction counter associated with a mobile application program (e.g., the mobile payment application 106) may be stored in a database (e.g., the storage 304). In step 1704, at least the storage key, an authentication component, and static payment credentials may be provisioned to the mobile device 104, wherein the static payment credentials are associated with a payment account.

In step 1706, a chip authentication program (CAP) token may be received from the mobile device 104. In step 1708, the authenticity of the received CAP token may be validated by a validation service (e.g., the CTVS 702). In one embodiment, the CAP token may be validated based on at least the provisioned authentication component and an additional credential received from the mobile device 104. In a further embodiment, the additional credential may be at least one of: a gesture, a password, a passcode, and a biometric identifier. In another embodiment, validating the authenticity of the CAP token may include validating the authenticity of the CAP token based on at least the application transaction counter.

In step 1710, a session key unpredictable number ($KS_{UN}$) may be generated by a processing device (e.g., the cloud system 302). In step 1712, a cloud unpredictable number ($UN_{CLOUD}$) may be generated by the processing device 302. In step 1714, the processing device 302 may identify an encrypted payload based on a derived CVC3 key ($KD_{CVC3}$), wherein the encrypted payload includes at least a CVC3 key of the plurality of CVC3 keys, the $KS_{UN}$, and the application transaction counter. In one embodiment, the $KD_{CVC3}$ may be genuine if the received CAP token is successfully validated, and may be fake if the received CAP token is unsuccessfully validated. In some embodiment, the payload may be encrypted using at least the storage key.

In step 1716, a transmitting device may transmit the encrypted payload to the mobile device 104 for use in generating a CVC3 value for use in a financial transaction. In step 1718, the transmitting device may transmit at least the $KS_{UN}$, $UN_{CLOUD}$, and application transaction counter to an issuer (e.g., the issuer 108) associated with the payment account for use in validating the generated CVC3 value used in the financial transaction.

Method for Generating a Dynamic Card Validation Code

Figure 18:
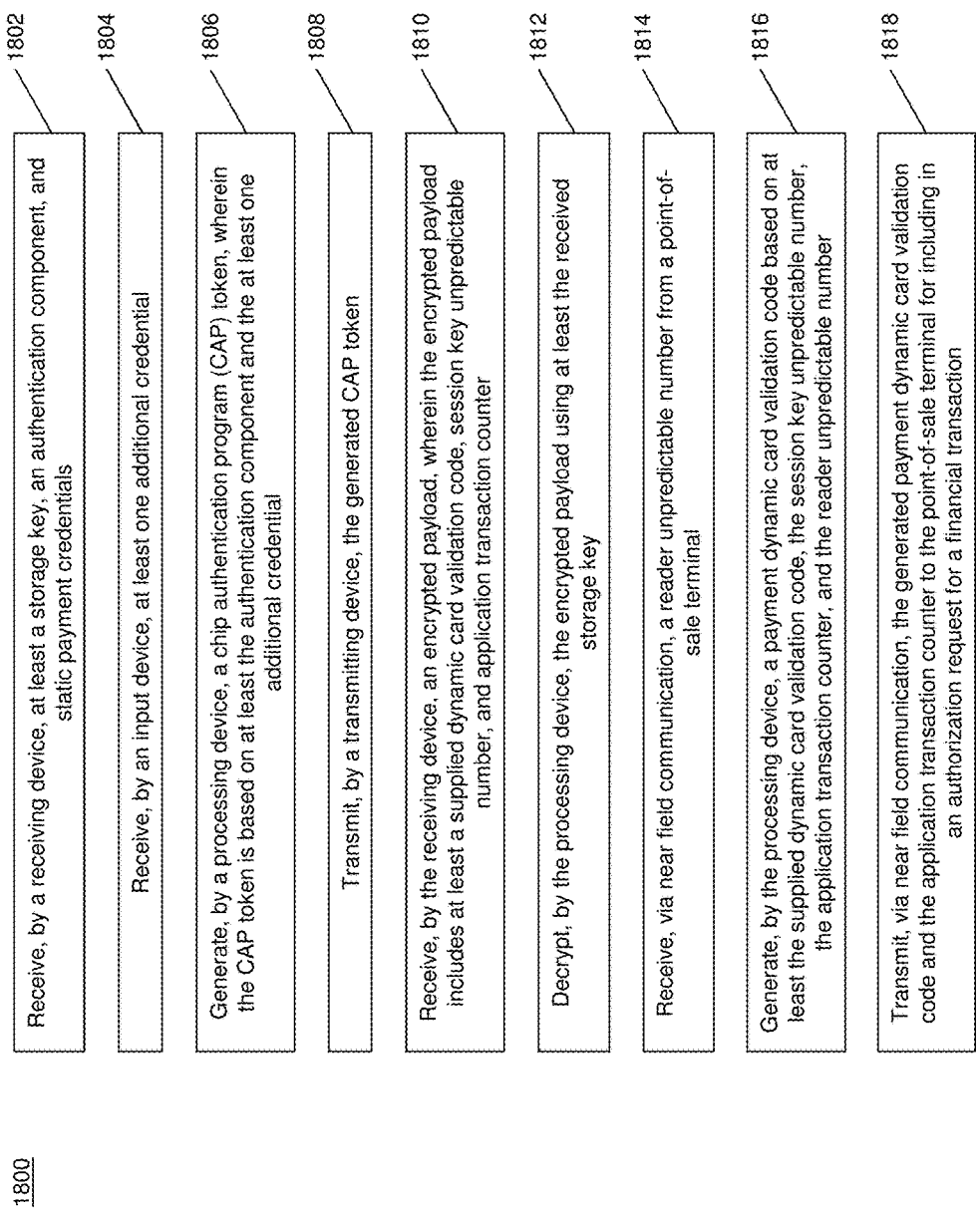
FIG. 18 is a flow chart illustrating an exemplary method for generating a dynamic card validation code in a mobile device lacking a secure element in accordance with exemplary embodiments.

FIG. 18 is a flow chart illustrating a method 1800 for generating a dynamic card validation code (CVC3) value in a mobile device (e.g., the mobile device 104) lacking a secure element.

In step 1802, at least a storage key, an authentication component, and static payment credentials may be received by a receiving device. In step 1804, at least one additional credential may be received by an input device (e.g., of the mobile device 104). In some embodiments, the at least one additional credential may include at least one of: a gesture, a password, a passcode, and a biometric identifier. In step 1806, a chip authentication program (CAP) token may be generated by a processing device, wherein the CAP token is based on at least the authentication component and the at least one additional credential.

In step 1808 the generated CAP token may be transmitted by a transmitting device. In step 1810, an encrypted payload may be received by the receiving device, wherein the encrypted payload includes at least a supplied CVC3 value, session key unpredictable number, and an application transaction counter. In step 1812, the processing device may decrypt the encrypted payload using at least the received storage key.

In step 1814, a reader unpredictable number may be received, via near field communication, from a point-of-sale terminal (e.g., the point-of-sale terminal 120). In step 1816, the processing device may generate a payment CVC3 value based on at least the supplied CVC3 value, the session key unpredictable number, the application transaction counter, and the reader unpredictable number. In step 1818, the generated payment CVC3 value and the application transaction counter may be transmitted, via near field communication, to the point-of-sale terminal 120 for including in an authorization request in a financial transaction.

Computer System Architecture

FIG. 19 illustrates a computer system 1900 in which embodiments of the present disclosure, or portions thereof, may be implemented as computer-readable code. For example, the payment credentials management 112, the remote notification service 114, the mobile device 104, the acquirer processing server 312, and the issuer processing server 308 may be implemented in the computer system 1900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6-18.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1918, a removable storage unit 1922, and a hard disk installed in hard disk drive 1912.

Various embodiments of the present disclosure are described in terms of this example computer system 1900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1904 may be a special purpose or a general purpose processor device. The processor device 1904 may be connected to a communication infrastructure 1906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1900 may also include a main memory 1908 (e.g., random access memory, read-only memory, etc.), and may also include a secondary memory 1910. The secondary memory 1910 may include the hard disk drive 1912 and a removable storage drive 1914, such as a floppy disk drive, a magnetic tape drive, an optical disk drive, a flash memory, etc.

The removable storage drive 1914 may read from and/or write to the removable storage unit 1918 in a well-known manner. The removable storage unit 1918 may include a removable storage media that may be read by and written to by the removable storage drive 1914. For example, if the removable storage drive 1914 is a floppy disk drive, the removable storage unit 1918 may be a floppy disk. In one embodiment, the removable storage unit 1918 may be non-transitory computer readable recording media.

In some embodiments, the secondary memory 1910 may include alternative means for allowing computer programs or other instructions to be loaded into the computer system 1900, for example, the removable storage unit 1922 and an interface 1920. Examples of such means may include a program cartridge and cartridge interface (e.g., as found in video game systems), a removable memory chip (e.g., EEPROM, PROM, etc.) and associated socket, and other removable storage units 1922 and interfaces 1920 as will be apparent to persons having skill in the relevant art.

Data stored in the computer system 1900 (e.g., in the main memory 1908 and/or the secondary memory 1910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1900 may also include a communications interface 1924. The communications interface 1924 may be configured to allow software and data to be transferred between the computer system 1900 and external devices. Exemplary communications interfaces 1924 may include a modem, a network interface (e.g., an Ethernet card), a communications port, a PCMCIA slot and card, etc. Software and data transferred via the communications interface 1924 may be in the form of signals, which may be electronic, electromagnetic, optical, or other signals as will be apparent to persons having skill in the relevant art. The signals may travel via a communications path 1926, which may be configured to carry the signals and may be implemented using wire, cable, fiber optics, a phone line, a cellular phone link, a radio frequency link, etc.

Computer program medium and computer usable medium may refer to memories, such as the main memory 1908 and secondary memory 1910, which may be memory semiconductors (e.g. DRAMs, etc.). These computer program products may be means for providing software to the computer system 1900. Computer programs (e.g., computer control logic) may be stored in the main memory 1908 and/or the secondary memory 1910. Computer programs may also be received via the communications interface 1924. Such computer programs, when executed, may enable computer system 1900 to implement the present methods as discussed herein. In particular, the computer programs, when executed, may enable processor device 1904 to implement the methods illustrated by FIGS. 6-18, as discussed herein. Accordingly, such computer programs may represent controllers of the computer system 1900. Where the present disclosure is implemented using software, the software may be stored in a computer program product and loaded into the computer system 1900 using the removable storage drive 1914, interface 1920, and hard disk drive 1912, or communications interface 1924.

Techniques consistent with the present disclosure provide, among other features, systems and methods for the provisioning of payment credentials to mobile devices lacking a secure element and the generation of payment cryptograms based thereon. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for generating and provisioning payment credentials to a mobile device lacking a secure element, comprising:
   generating, by a processing device of a remote system, a card profile associated with a payment account, wherein the card profile includes at least payment credentials corresponding to the associated payment account and a profile identifier;
   provisioning, by the remote system, to a mobile device, the generated card profile;
   receiving, by the remote system, from the mobile device, a key request, wherein the key request includes at least a mobile personal identification number (PIN) and the profile identifier;
   in response to receiving the key request from the mobile device, determining, by an authentication device of the remote system, whether the mobile PIN is authentic;
   generating, if the mobile PIN is successfully authentic, a single use key by the processing device of the remote system, wherein the single use key (i) is configured to be used one time, by the mobile device, to generate a payment cryptogram valid for a single financial transaction with a contactless point-of-sale device of a merchant, (ii) includes at least the profile identifier, an application transaction counter, and a generating key, and (iii) is genuine;
   generating, if the mobile PIN is unsuccessfully authenticated, the single use key by the processing device of the remote system, wherein the single use key (i) is configured to be used one time, by the mobile device, to generate a payment cryptogram valid for the single financial transaction, (ii) includes at least the profile identifier, the application transaction counter, and the generating key, (iii) is an incorrect value, and (iv) will fail authorization of the single financial transaction; and transmitting, by a transmitting device of the remote system, the generated single use key to the mobile device, wherein the mobile device lacks a secure element and where the mobile PIN is not required to be transmitted to the mobile device with the single use key.

2. The method of claim 1, further comprising:

transmitting, by the transmitting device of the remote system, the generated single use key to an issuer associated with the payment account.

3. The method of claim 1, wherein provisioning, by the remote system, the generated card profile to the mobile device includes building a message including the generated card profile, generating an encryption key, encrypting the message using the generated encryption key, and provisioning the encrypted message to the mobile device.

4. The method of claim 1, wherein transmitting the generated single use key to the mobile device may include building a message, by the remote system, including the generated single use key, generating an encryption key, encrypting the message using the generated encryption key, and provisioning the encrypted message to the mobile device.

5. The method of claim 1, wherein the generated single use key is inactive.

6. The method of claim 5, further comprising:

receiving, by the remote system, from the mobile device, an indication of use of the single use key; and activating, by the processing device of the remote system, the generated single use key.

7. The method of claim 6, further comprising:

transmitting, by the transmitting device of the remote system, an indication of activation of the single use key to an issuer associated with the payment account.

8. The method of claim 1, wherein the payment cryptogram is an application cryptogram or a dynamic card validation code.

9. The method of claim 1, wherein using the mobile PIN includes using, by the authentication device, the mobile PIN using an XOR method.

10. A remote electronic system for generating and provisioning payment credentials to a mobile device lacking a secure element, comprising:

a transmitting device, of the remote electronic system;

a processing device, of the remote electronic system, configured to generate a card profile associated with a payment account, wherein the card profile includes at least payment credentials corresponding to the associated payment account and a profile identifier;

a provisioning device, of the remote electronic system, configured to provision, to a mobile device lacking a secure element, the generated card profile;

a receiving device, of the remote electronic system, configured to receive, from the mobile device, a key request, wherein the key request includes at least a mobile personal identification number (PIN) and the profile identifier; and an authentication device, of the remote electronic system configured to authenticate the mobile PIN in response to receiving the key request, wherein the processing device, of the remote electronic system, is further configured to generate a single use key, wherein, if the mobile PIN is successfully authenticated, the single use key (i) is configured to be used one time, by the mobile device, to generate a payment cryptogram valid for a single financial transaction with a contactless point-of-sale device of a merchant, (ii) includes at least the profile identifier, an application transaction counter, and a generating key for use in generating the payment cryptogram valid for the single financial transaction, and (iii) is genuine, and generate the single use key, wherein, if the mobile PIN is unsuccessfully authenticated, the single use key (i) is configured to be used one time, by the mobile device, to generate a payment cryptogram valid for the single financial transaction, (ii) includes at least the profile identifier, the application transaction counter, and the generating key, (iii) is an incorrect value, and (iv) will fail authorization of the single financial transaction, and the transmitting device, of the remote electronic system, is configured to transmit the generated single use key to the mobile device, wherein the mobile PIN is not required to be transmitted to the mobile device with the single use key.

11. The system of claim 10, wherein the transmitting device, of the remote electronic system, is further configured to transmit the generated single use key to an issuer associated with the payment account.

12. The system of claim 10, wherein the authentication device, of the remote electronic system, is further configured to use the mobile PIN using an XOR method.

13. The system of claim 10, wherein the provisioning device, of the remote electronic system, provisions the generated card profile to the mobile device within a message encrypted by an encryption key.

14. The system of claim 10, wherein the transmitting device, of the remote electronic system, transmits the generated single use key to the mobile device within a message encrypted by an encryption key.

15. The system of claim 10, wherein the generated single use key is inactive.

16. The system of claim 15, wherein the receiving device, of the remote electronic system, is further configured to receive, from the mobile device, an indication of use of the single use key, and the processing device, of the remote electronic system, is further configured to activate the generated single use key.

17. The system of claim 16, wherein the transmitting device, of the remote electronic system, is further configured to transmit an indication of activation of the single use key to an issuer associated with the payment account.

18. The system of claim 10, wherein the payment cryptogram is an application cryptogram or a dynamic card validation code.

* * * * *